US011222219B2

(12) United States Patent
Lund et al.

(10) Patent No.: US 11,222,219 B2
(45) Date of Patent: Jan. 11, 2022

(54) PROXIMATE VEHICLE LOCALIZATION AND IDENTIFICATION

(71) Applicant: QUALCOMM Incorporated, San Diego, CA (US)

(72) Inventors: Benjamin Lund, Escondido, CA (US); Anthony Blow, San Diego, CA (US); Edwin Chongwoo Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 108 days.

(21) Appl. No.: 16/550,616

(22) Filed: Aug. 26, 2019

(65) Prior Publication Data
US 2020/0327343 A1 Oct. 15, 2020

Related U.S. Application Data

(60) Provisional application No. 62/834,227, filed on Apr. 15, 2019.

(51) Int. Cl.
*G06K 9/00* (2006.01)
*G06T 7/70* (2017.01)
*H04W 4/40* (2018.01)

(52) U.S. Cl.
CPC .......... *G06K 9/00825* (2013.01); *G06T 7/70* (2017.01); *G06T 2207/30252* (2013.01); *H04W 4/40* (2018.02)

(58) Field of Classification Search
None
See application file for complete search history.

(56) References Cited

U.S. PATENT DOCUMENTS

| 2014/0085428 A1* | 3/2014 | Stahlin | G06K 9/00791 |
| | | | 348/46 |
| 2014/0241579 A1 | 8/2014 | Nonaka | |
| 2017/0200061 A1* | 7/2017 | Julian | G06K 9/00791 |

(Continued)

FOREIGN PATENT DOCUMENTS

| EP | 3273408 A1 | 1/2018 |
| WO | WO-2012152746 A1 | 11/2012 |

OTHER PUBLICATIONS

E. Ohn-Bar, S. Sivaraman and M. Trivedi, "Partially occluded vehicle recognition and tracking in 3D," 2013 IEEE Intelligent Vehicles Symposium (IV), Gold Coast, QLD, 2013, pp. 1350-1355, doi: 10.1109/IVS.2013.6629654. (Year: 2013).*

(Continued)

*Primary Examiner* — Siamak Harandi
(74) *Attorney, Agent, or Firm* — Campbell C. Chiang; Paradice and Li LLP

(57) ABSTRACT

Disclosed embodiments pertain to a method for determining position information of a target vehicle relative to an ego vehicle. The method may comprise: obtaining, by at least one image sensor, first images of one or more target vehicles and classifying at least one target vehicle from the one or more target vehicles based on the one or more first images. Further, vehicle characteristics corresponding to the least one target vehicle may be obtained based on the classification of the least one target vehicle. Position information of the at least one target vehicle relative to the ego vehicle may be determined based on the vehicle characteristics.

45 Claims, 15 Drawing Sheets

(56) References Cited

U.S. PATENT DOCUMENTS

2019/0100134 A1* 4/2019 Eiden .................... G06T 7/70
2020/0110948 A1* 4/2020 Pfeifle ................ B60W 40/04

OTHER PUBLICATIONS

Hai W., et al., "Occluded Vehicle Detection with Local Connected Deep Mode 1", Multimedia Tools and Applications Kluwer Academic Publishers, Boston, US, vol. 75, No. 15, Dec. 8, 2015 (Dec. 8, 2015), pp. 9277-9293, XP036034936, ISSN: 1380-7501, DOI: 10.1007/S11042-015-3141-0 [retrieved on Dec. 8, 2015] abstract.
International Search Report and Written Opinion—PCT/US2020/022400—ISA/EPO—dated Jun. 18, 2020.

* cited by examiner

330 →

| Vehicle Make | Vehicle Model | Model Year | Trim | Vehicle Type | Front View | Rear View | . . . |
|---|---|---|---|---|---|---|---|
| Ford | Econoline | 2014 | Club Wagon | Passenger Van | 344 | 342 | . . . |
| . . . | . . . | . . . | . . . | . . . | . . . | . . . | . . . |
| . . . | . . . | . . . | . . . | . . . | . . . | . . . | . . . |
| . . . | . . . | . . . | . . . | . . . | . . . | . . . | . . . |

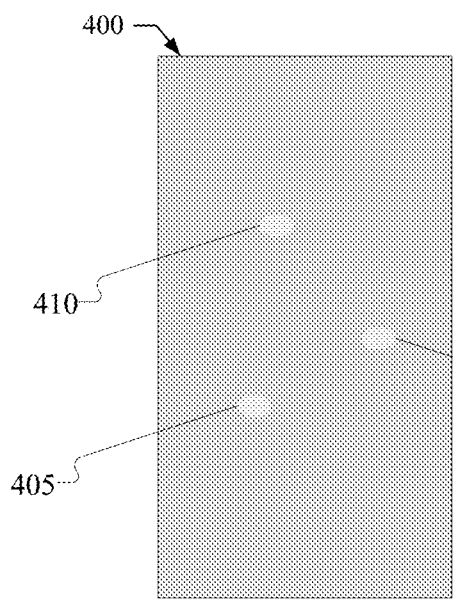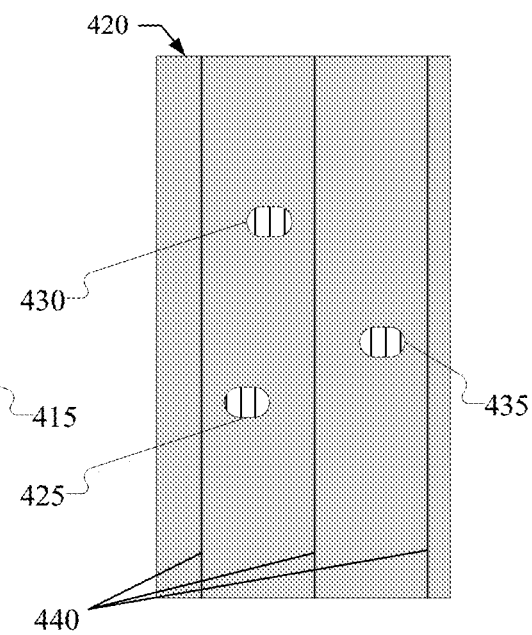
FIG. 4A  FIG. 4B
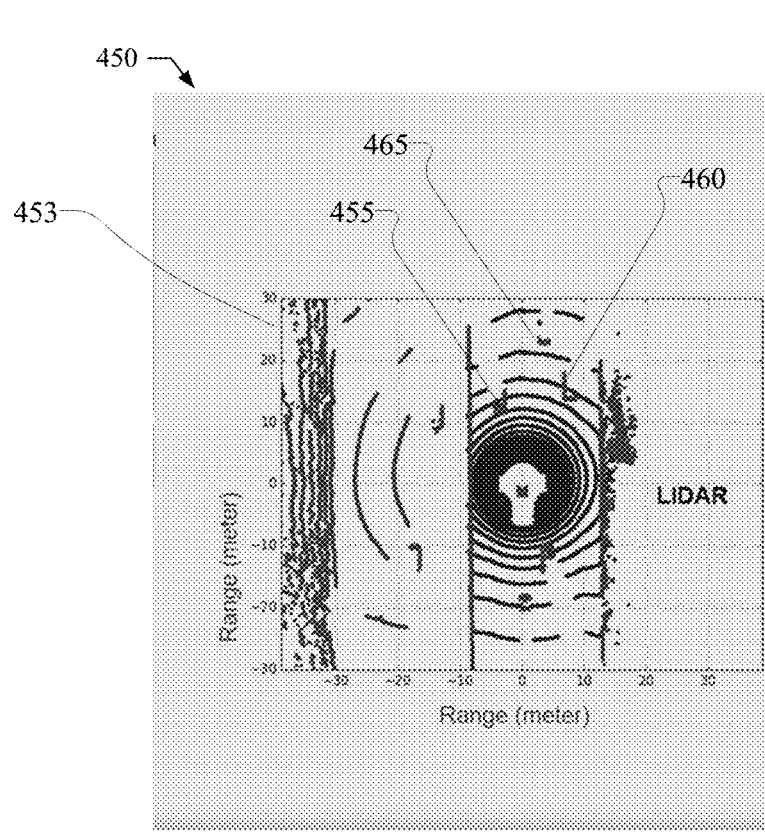
FIG. 4C

PROXIMATE VEHICLE LOCALIZATION AND IDENTIFICATION

CROSS REFERENCE TO RELATED APPLICATIONS

This application claims the benefit of and priority to U.S. Provisional Patent Application No. 62/834,227, entitled "PROXIMATE VEHICLE LOCALIZATION AND IDENTIFICATION," filed Apr. 15, 2019, which is assigned to the assignee hereof and incorporated by reference in its entirety.

FIELD

The subject matter disclosed herein relates generally to the localization, orientation, and/or identification of target vehicles proximate to an ego vehicle.

BACKGROUND

Autonomous driving systems (ADS) may be fully autonomous or partially autonomous. Partially autonomous driving systems include advanced driver-assistance systems (ADAS). ADS based vehicles, which are becoming increasingly prevalent, may use sensors to determine the presence of nearby vehicles. For example, an ego vehicle may use ranging sensors like radar (Radio Detection and Ranging) or lidar (Light Detection and Ranging) input to detect nearby vehicles. Radar refers to the use of radio waves to determine the position and/or velocity of objects. Lidar refers to remote sensing technology that measures distance by illuminating a target (e.g. with a laser or other light) and analyzing the reflected light. Conventionally, ranging sensors coupled to an ADS may detect and/or indicate the presence of proximate vehicles based on sensory input. In conventional systems, the detected vehicles may be displayed as moving rectangles, blobs, or segmented objects, and drivers may find it difficult to correlate displayed information with vehicles seen on the roadway thereby limiting its utility. Therefore, techniques to provide meaningful and actionable vehicle information are desirable.

SUMMARY

In some embodiments, an ego vehicle capable of determining one or more position information of at least one target vehicle relative to the ego vehicle may comprise: at least one image sensor, a memory, and at least one processor coupled to the memory and the at least one image sensor and configured to: obtain, using the at least one image sensor, one or more first images of one or more target vehicles; classify at least one target vehicle from the one or more target vehicles based on the one or more first images; obtain one or more vehicle characteristics corresponding to the least one target vehicle based on the classification of the least one target vehicle; and determine one or more position information of the at least one target vehicle relative to the ego vehicle based on the one or more vehicle characteristics.

In another aspect, a method for determining one or more position information of at least one target vehicle relative to an ego vehicle, may comprise: obtaining one or more first images of one or more target vehicles; classifying the at least one target vehicle of the one or more target vehicles based on the one or more first images; obtaining one or more vehicle characteristics corresponding to the least one target vehicle based on the classification of the least one target vehicle; and determining the one or more position information of the at least one target vehicle relative to the ego vehicle based on the one or more vehicle characteristics.

In a further aspect, an apparatus for determining one or more position information of at least one target vehicle relative to an ego vehicle may comprise: means for obtaining, one or more first images of one or more target vehicles; means for classifying the at least one target vehicle from the one or more target vehicles based on the one or more first images; means for obtaining one or more vehicle characteristics corresponding to the least one target vehicle based on the classification of the least one target vehicle; and means for determining the one or more position information of the at least one target vehicle relative to the ego vehicle based on the one or more vehicle characteristics.

In some embodiments, a non-transitory computer-readable medium may comprise stored instructions to configure a processor on an ego vehicle to: obtain, using at least one image sensor, one or more first images of one or more target vehicles; classify at least one target vehicle from the one or more target vehicles based on the one or more first images; obtain one or more vehicle characteristics corresponding to at least one target vehicle based on the classification of the least one target vehicle; and determine the one or more position information of the at least one target vehicle relative to the ego vehicle based on the one or more vehicle characteristics.

The methods disclosed may be performed by an ADS enabled vehicle based on images captured by an image sensor on vehicle, information from other sensors, and may use protocols associated with wireless communications including cellular and vehicle to everything (V2X) communications. Embodiments disclosed also relate to software, firmware, and program instructions created, stored, accessed, read, or modified by processors using computer readable media or computer readable memory.

BRIEF DESCRIPTION OF THE DRAWINGS

FIGS. 4A-4C show some example displays associated with conventional radar and lidar based systems.

Figure 1:
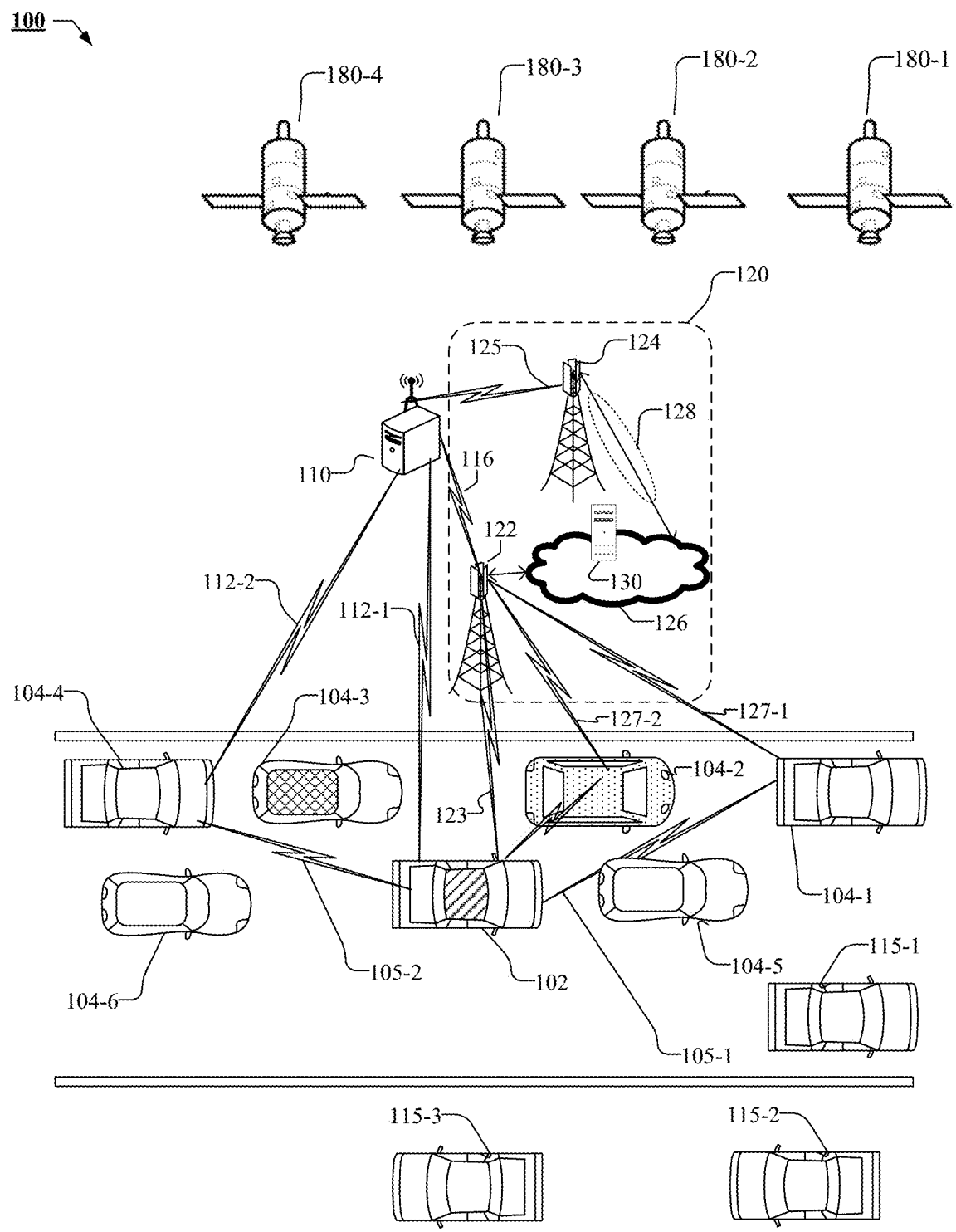
FIG. 1 illustrates a system to facilitate autonomous driving in accordance with some disclosed embodiments.

Like reference numbers and symbols in the various figures indicate like elements, in accordance with certain example implementations. In addition, multiple instances of an element may be indicated by following a first number for the element with a letter or with a hyphen and a second number. For example, multiple instances of an element 104 may be indicated as 104-1, 104-2, 104-3 etc. When referring to such an element using only the first number, any instance of the element is to be understood (e.g. elements 104 in the previous example would refer to elements 104-1, 104-2, and/or 104-3).

DETAILED DESCRIPTION

Some disclosed embodiments pertain to the use of information obtained from one or more sensors (e.g. image sensors or cameras, ultrasonic sensors, etc.) coupled to an ego vehicle to facilitate or enhance ADS decision making. In some embodiments, proximate and pertinent vehicles may be classified and/or uniquely identified based on sensor input, and information from the classification and/or unique identification may be used to enhance localization of proximate and pertinent vehicles. ADS may refer to partially or wholly autonomous driving systems. For example, Level 1 ADS may handle a single task, such as automatic braking, at a given time. Vehicle equipped with Level 2 ADS may be able to perform two automated functions (e.g. accelerating/decelerating and steering) at a given time. Level 3 ADS enabled vehicles may automate some safety-critical functions, although transfer of functions to drivers or driver intervention may be used in some situations. Level 4 ADS equipped vehicles can be driverless within certain environments referred to as the operational design domain (ODD) of the vehicle. Level 5 ADS systems are fully autonomous driverless systems that may operate without the presence of drivers. Localization refers to the determination of the pose of a target vehicle relative to an ego vehicle.

The term "ego vehicle" or "subject vehicle" may refer to a vehicle that may obtain information related to its environment or operation and utilize the information to perform one or more functions. The term "ego vehicle," as used herein, may also refer to components in the vehicle that perform some or all of the functions on behalf of the vehicle. For example, a mobile device and/or another component located in an ego vehicle may be temporarily located in the ego vehicle and may obtain and process some or all of the obtained information. The term mobile device may refer to a smartphone, mobile station, and/or a computing device such as a wearable device, laptop, handheld, tablet etc. Thus, the term ego vehicle may refer to a vehicle, and/or devices/components permanently or temporarily in the vehicle, and/or any combination thereof, which may, individually, or in combination, obtain information about an environment related the ego vehicle and/or information pertaining to operation of the ego vehicle, and utilize the information to perform one or more functions. Unless otherwise noted, for the purposes of the description below, the term ego vehicle may be understood to include the use devices and/or components located in the ego vehicle.

Image sensors may include cameras, charge coupled device (CCD) based devices, or Complementary Metal Oxide Semiconductor (CMOS) based devices, lidar, computer vision devices, etc. on a vehicle, which may be used to obtain images of an environment around the vehicle. Image sensors, which may be still and/or video cameras, may capture a series of 2-Dimensional (2D) still and/or video image frames of an environment. In some embodiments, image sensors may take the form of a depth sensing camera, or may be coupled to depth sensors. The term "depth sensor" is used to refer to functional units that may be used to obtain depth information for images captured by the image sensor. In some embodiments, image sensors may comprise monochrome cameras, and/or Red-Green-Blue (RGB) cameras, and/or RGB-Depth (RGBD) cameras, which may capture per-pixel depth (D) information when the depth sensor is enabled, in addition to color (RGB) images. In one embodiment, depth information may be obtained from stereo sensors such as a combination of an infra-red structured light projector and an infra-red camera registered to a RGB camera. In some embodiments, image sensors may be stereoscopic cameras capable of capturing 3 Dimensional (3D) images. For example, a depth sensor may form part of a passive stereo vision sensor, which may use two or more cameras to obtain depth information for a scene. The pixel coordinates of points common to both cameras in a captured scene may be used along with camera parameter information, camera pose information and/or triangulation techniques to obtain per-pixel depth information. In some embodiments, image sensor may include lidar sensors, which may provide measurements to estimate the relative distance of objects.

The term "pose" refers to the position (e.g. X, Y, Z coordinates) and orientation (e.g. roll, pitch, and yaw) of an object relative to a frame of reference. Pose may be specified as a 6 Degrees-of-Freedom (DOF) pose, which may include positional coordinates (e.g. X, Y, Z) and orientation information (e.g. roll, pitch, and yaw). For example, the term "camera pose" or "image sensor pose" may refer to the position and orientation of an image sensor on an ego vehicle and the term "vehicle pose" may refer to the position and orientation of a vehicle relative to a frame of reference. The terms "position" and "location" are used interchangeably herein. Position information may also be referred to as a location, location estimate, location fix, fix, position, position estimate or position fix, and may be geographic, thus providing location coordinates (e.g., latitude and longitude) which may or may not include an altitude component (e.g., height above or below some reference such as sea level, ground/road level, tier level, etc.). Alternatively, a location may be expressed as a civic location (e.g., as a postal address or the designation of some point or small area in a building such as a particular room or floor). A location may also be expressed as an area or volume (defined either geographically or in civic form) within which the entity in question is expected to be located with some probability or confidence level (e.g., 67%, 95%, etc.). A location may further be expressed as a relative location comprising, for example, a distance and direction or relative X, Y (and Z) coordinates defined relative to some origin at a known location, which may be defined geographically, in civic terms, or by reference to a point, area, or volume indicated on a map, floor plan or other plan. In the description contained herein, the use of the terms position, position information, location, or location information may comprise one or more of these variants unless indicated otherwise. When determining the location of a vehicle, it is common to solve for local x, y, and possibly z coordinates and then, if needed, convert the local coordinates into absolute ones (e.g. for latitude, longitude and altitude above or below mean sea level). In some embodiments, the position of an object may include a pose of the object relative to a frame of reference. As used herein, the term "position information" includes pose information (position and orientation).

The term "relative pose" is also used to refer to the position and orientation of an object (e.g. a vehicle) relative to a current position of another object (e.g. an ego vehicle). The "relative pose" may be specified as a 6-DOF pose (e.g.

relative to a frame of reference centered on a current position of an ego vehicle). The reference frame to determine pose relative to an ego vehicle may be centered: (a) on the ego vehicle, or (b) on image sensor(s) obtaining images of the target vehicles). In some instances, because vehicular motion on roads is typically planar (i.e. the vertical motion is constrained) over short distances, the pose may also be expressed in lesser degrees of freedom (e.g. 3 DOF). Lowering the degrees of freedom available may facilitate computations of target vehicle distance, target vehicle relative pose, and other position parameters related to the target vehicle.

In some embodiments, an ego vehicle may use images obtained by onboard cameras to facilitate or enhance ADS decision making, which may be useful: to classify and/or uniquely identify and locate nearby and pertinent vehicles (which are also referred to as "target vehicles"). In some embodiments, one or more of the above functions including one or more of: image processing, target vehicle classification and/or target vehicle unique identification and/or target vehicle localization (e.g. position and/or orientation determination), and/or other functions may be performed, in whole, or in part, by mobile devices (e.g. smartphones, tablets, laptops, etc.) that may be temporarily located in the (ego) vehicle and that may obtain image data from the (ego) vehicle.

The terms "classify" or "classification," as used herein, refer to the determination of a generic object type based on visible features of the object. The term "identify" or "identification" or "unique identification" refer to use of visible characteristics, either individually, or in combination with other sensory input, to distinguish the object from other objects (e.g. of the same or similar genus). For example, the term "vehicle classification" may refer to the determination of one or more of: a vehicle type (e.g. car) and/or vehicle sub-type (hatchback, etc.), a vehicle make (e.g. Honda), and/or a vehicle model (e.g. 2015 Accord) and/or a trim level or package (e.g. 2015 Accord "SE") based on visible vehicle characteristics. The terms "vehicle identification" or "unique identification" refer to determination of visible vehicle characteristics (internal and/or external), which, either individually, or in combination, may be distinctive to a vehicle and used to distinguish the vehicle from other vehicles (e.g. Red Honda Civic hatchback with License plate ABC123, or Red Honda Civic hatchback with left yellow bumper sticker, etc.) that are visible to an ego vehicle at some time. The terms "vehicle characteristics" or "vehicle characteristic information" refer to a set of distinguishing features of a vehicle (e.g. a target vehicle) that may be used to classify and/or identify the vehicle (e.g. the target vehicle). For example, captured images of a target vehicle may be compared to stored images of vehicles to classify and/or identify the target vehicle. Such distinguishing features may include, for example, one or more of: physical attributes (such as dimensional information (e.g. width, length, height, dimensional ratios, vehicle form factor, vehicle license plate, vehicle color, any visible ornamentation (e.g. a bumper sticker, window stickers, visible internal ornamentation, etc.), structural attributes (e.g. spoilers, dents, broken taillights, wheel rims, bike racks, roof racks, roof boxes/carriers, retractable tops, etc.). In some embodiments, the distinguishing vehicle characteristics may also be based on features associated with vehicle occupants and/or vehicle contents. In some embodiments, distinct features of an accessory (e.g. lights, logos, etc.) can be used to classify and/or uniquely identify vehicles. In some embodiments, the classification of a vehicle may be hierarchical. For example, when a hierarchical classification is used, a vehicle may be classified as a car (top level), then as a sedan, coupe, etc. (next level), then by make (e.g. Honda), and model (e.g. 2016 Accord SE). Classification level may depend both on features visible in images and the quality of the images. Thus, a target vehicle may be classified as a passenger van based on image features, but a more detailed classification may not be available.

Vehicle characteristics for classification and/or identification of a target vehicle may include one or more of: physical attributes (e.g. form factor, various dimensions and/or dimensional ratios, vehicle color(s), license plate number, distinct features of accessories (such as lights, logos, etc.), ornamentation, modifications, etc.); behavioral attributes (e.g. stopped, moving, turning, braking, drifting or "hugging" the lane, etc.); positional attributes (lane number in which the vehicle may be travelling, pose relative to ego vehicle, etc.); visual communication attributes (e.g. high beams, turn signal, modulation of tail lights to transmit encoded information about, etc.); interior attributes (e.g. passenger count, passenger ornamentation (e.g. glasses, headgear, etc.), presence of car seats, rear view mirror ornamentation, etc.); auditory attributes (e.g. tire hum, engine noise, noise due to air turbulence, etc.); RF characteristics (e.g. Received Signal Strength Indication (RSSI), Doppler, etc.). Vehicle attributes may include an accelerometer signature that may depend on road surface. An accelerometer signature may depend on bumps in the road surface, lane reflectors, paint markings, as well as the road surface material. Vehicles travelling on the same section of roadway may have correlated accelerometer signatures. For example, in a situation where an ego vehicle follows a target vehicle, the ego vehicle and target vehicle may have similar accelerometer signatures. The correlation in accelerometer signatures at a point in time may be used to estimate target vehicle accelerometer information, which may facilitate unique identification and/or localization of the target vehicle (s). In some embodiments, vehicle characteristics may be specific to a vehicle make and model.

Image processing and/or image recognition techniques may be used along with available sensory information to classify vehicles. Based on the target vehicle classification, one or more vehicle characteristics corresponding to the one or more classified target vehicles may be obtained and position information related to the one or more classified vehicles may be determined based on the corresponding vehicle characteristics. The image sensor pose and/or other image sensor parameters may be used during target vehicle classification and/or target vehicle position determination. For example, camera parameters such as focal length, camera orientation etc. may be used to inform vehicle classification and/or the obtaining of vehicle characteristics. Vehicle characteristics may include one or more of the attributes/parameters discussed above (e.g. width, length, height, a form factor, dimensional ratios, etc.). In some embodiments, position information for a target vehicle may be determined based on target vehicle characteristics. For example, visible features in an image of the target vehicle may be correlated with known vehicle characteristics (e.g. determined based on the classification) to determine position information for the target vehicle.

The term "target vehicle" is used to refer to vehicles being considered as candidates for classification and localization at a current time by an ego vehicle. Target vehicles may be both pertinent and proximate. Pertinent vehicles are vehicles determined to be likely to encounter or interact with an ego vehicle. Pertinence may be context sensitive (e.g. based on the type of location of ego vehicle such as an overpass, an underpass, bridge, tunnel, parking structure, parking lot, city street, mountain road, single lane road, undivided highway, divided highway, etc.). For example, pertinent vehicles may be those that are travelling on the same side of a divided highway as the ego vehicle or vehicles on both sides of an undivided highway. Examples of vehicles that may be determined as not pertinent may include vehicles travelling in a direction opposite to that of the ego vehicle on the other side of a divided highway, or vehicles travelling below a bridge where an ego vehicle is currently travelling, etc. For example, the Doppler shift of V2V signals transmitted by vehicles may be used to estimate direction of travel and determine vehicles that are not pertinent. Vehicles that are not pertinent may not be tracked and are not considered target vehicles. Proximate vehicles may include vehicles whose current distance from ego vehicle may be less than some specified threshold or within line of sight of the vehicle. In some instances, the threshold may be based on one or more of: a current velocity of the ego vehicle, and/or heading, acceleration and/or velocity of a target vehicle relative to an ego vehicle.

Conventional systems may not provide meaningful actionable information to an ADS. Augmenting ADS with additional actionable information based on the sensory input including information obtained from images pertaining to nearby and pertinent vehicles may enhance ADS decision making, target vehicle localization (e.g. target vehicle position and orientation), vehicle safety, and/or road utilization (e.g. allowing a larger number of vehicles to use the road at any given time). For example, the additional target vehicle information (e.g. position/orientation information, vehicle characteristic information etc. determined from sensor input) may enhance road utilization by optimizing distances between vehicles and/or facilitating higher average vehicular speeds thereby increasing throughput. Moreover, additional target vehicle information (e.g. determined from sensor input) may simultaneously increase safety factors by decreasing the likelihood of accidents individually (e.g. for a given vehicle) and system wide.

Disclosed embodiments pertain to the determination of position information relating to one or more target vehicles relative to an ego vehicle based on images of the one or more target vehicles obtained by at least one image sensor. One or more of the target vehicles may be classified based on one or more corresponding images of the target vehicles.

FIG. 1 illustrates a system 100 to facilitate autonomous driving in accordance with some disclosed embodiments. For example, system 100 may facilitate or enhance ADS associated with an autonomous or semi-autonomous vehicle 102 (referred to herein as an "ego vehicle" or "ego vehicle"). In some embodiments, ego vehicle 102 may use information obtained from onboard sensors, including image sensors, to enhance or augment ADS decision making. In some embodiments, the sensors may be mounted at various locations on the vehicle—both inside and outside.

In some embodiments, system 100 may use, for example, a Vehicle-to-Everything (V2X) communication standard, in which information may be passed between a vehicle (e.g. source vehicle 102) and other entities coupled to a communication network 120, which may include wireless communication subnets. The term "coupled" in relation to two entities indicates that links between the two entities may be direct (without an intermediary) or indirect (e.g. use one or more intermediaries). Coupling may occur through wired and/or wireless interfaces. V2X services may include, for example, one or more of services for: Vehicle-to-Vehicle (V2V) communications (e.g. between vehicles via a direct communication interface such as Proximity-based Services (ProSe) Direction Communication (PC5) and/or Dedicated Short Range Communications (DSRC)), Vehicle-to-Pedestrian (V2P) communications (e.g. between a vehicle and a User Equipment (UE) such as a mobile device), Vehicle-to-Infrastructure (V2I) communications (e.g. between a vehicle and a base station (BS) or between a vehicle and a roadside unit (RSU)), and/or Vehicle-to-Network (V2N) communications (e.g. between a vehicle and an application server). V2X includes various modes of operation for V2X services as defined in Third Generation Partnership Project (3GPP) TS 23.285. One mode of operation may use direct wireless communications between V2X entities when the V2X entities are within range of each other. Another mode of operation may use network based wireless communication between entities. The modes of operation above may be combined or other modes of operation may be used if desired. In some embodiments, a V2X and/or other protocol may allow a vehicle (e.g. ego vehicle 102) to passively monitor and/or passively receive transmissions by another vehicle (e.g. broadcast from one or more target vehicles 104) without negotiation/establishment of a communication link between the two vehicles (e.g. ego vehicle 102 and the one or more target vehicles 104). Unless specified otherwise, a link may be active or passive.

The V2X standard may be viewed as facilitating ADS, which includes ADAS. Depending on capabilities, an ADS may make driving decisions (e.g. navigation, lane changes, determining safe distances between vehicles, cruising/overtaking speed, braking, platooning, parking, etc.) and/or provide drivers with actionable information to facilitate driver decision making. The term "platooning" refers to the movement of a group of vehicles as a unit over some time period. In platooning, the distances between vehicles in the group (or platoon) may be maintained relatively constant, while the group (or platoon) and individual vehicles in the group maintain an appropriate speed. In some embodiments, V2X may use low latency communications thereby facilitating real time or near real time information exchange and precise positioning. As one example, positioning techniques, such as one or more of: Satellite Positioning System (SPS) based techniques (e.g. based on space vehicles 180) and/or cellular based positioning techniques such as time of arrival (TOA), time difference of arrival (TDOA) or observed time difference of arrival (OTDOA), may be enhanced using V2X assistance information. V2X communications may thus help in achieving and providing a high degree of safety for moving vehicles, pedestrians, etc.

Disclosed embodiments also pertain to the use of information obtained from one or more sensors (e.g. image sensors, ultrasonic sensors, radar, etc.) coupled to ego vehicle 102 to facilitate or enhance ADS decision making. For example, in some embodiments, ego vehicle 102 may use images obtained by onboard image sensors to facilitate or enhance ADS decision making Image sensors may include cameras, CMOS sensors, CCD sensors, and lidar. In some embodiments, image sensors may include depth sensors. Information from vehicular sensors (e.g. image sensors or other sensors) in ego vehicle 102 may also be useful to facilitate autonomous driving/decision making: (a) in situations where one or more target vehicles 104 in the vicinity of ego vehicle 102 lack V2V communication capability; and/or (b) in situations where V2X communications may be limited or unavailable to ego vehicle 102. For example, ego vehicle 102 may use information obtained from sensors to classify and/or uniquely identify and/or localize target vehicles based on locally stored information (e.g. stored target vehicle images, stored target vehicle features, etc.).

For example, in FIG. 1, vehicles 104-1 through 104-6 (also referred to as "target vehicles 104") may be vehicles that have been, or are being classified (and/or uniquely identified), and are being monitored by ego vehicle 102. Target vehicles 104 may include unobscured target vehicles (e.g. 104-2 and 104-5) and vehicles (e.g. 104-1) that may partially obscured (e.g. by another vehicle). In some embodiments, communications may be broadcast from one or more target vehicles 104 and received by ego vehicle 102 Thus, message reception from a target vehicle may occur with or without establishment of an active communication link between ego vehicle 102 and target vehicle 104.

A roadway around ego vehicle 102 may also include one or more vehicles 115 that are not currently being monitored by ego vehicle 102. For example, vehicle 115-1 may not be proximate (e.g. exceed some distance threshold from ego vehicle 102) and may not be considered as a target vehicle. As another example, vehicles 115-2 and 115-3 on the other side of the divided roadway (e.g. determined based on location, radar, and/or Doppler frequency shift), which may be traveling in a direction opposite to ego vehicle 102, may be ignored by ego vehicle 102. The terms "Doppler shift," or "Doppler frequency shift," or "Doppler effect," pertain to an observed change in frequency of a received signal (e.g. at a receiver) relative to the frequency of the transmitted signal (e.g. by a transmitter) on account of relative motion between the receiver and the transmitter. Doppler measurements may be used to determine range rate between an ego vehicle (e.g. receiver of V2V communications) and a target vehicle (e.g. transmitter of V2V communications). Range rate pertains to the rate at which the range or distance between the ego vehicle and target vehicle changes over some time period. Because nominal frequency bands for V2X, cellular, and other communications are known, the Doppler shift may be determined and used to calculate range rate and other motion related parameters.

Because of vehicle motion relative to ego vehicle 102, the set of target vehicles 104 may change with time. Vehicles that were not previously considered for classification and localization may be included in the set of target vehicles 104 at a current time based on various parameters (e.g. increased proximity, relative direction of travel, etc.), and a previously monitored vehicle may be removed from the set of target vehicles 104 based on various parameters (e.g. increased distance from ego vehicle 102, time elapsed from the last detection of the target vehicle 104, etc.).

As shown in FIG. 1, communication network 120 may operate using direct or indirect wireless communications between ego vehicle 102 and other entities, such as Application Server (AS) 110 and one or more target vehicles 104 with V2X/V2V functionality. For example, the wireless communication may occur over, e.g., Proximity-based Services (ProSe) Direction Communication (PC5) reference point as defined in 3GPP TS 23.303, and may use wireless communications under IEEE 1609, Wireless Access in Vehicular Environments (WAVE), Intelligent Transport Systems (ITS), and IEEE 802.11p, on the ITS band of 5.9 GHz, or other wireless connections directly between entities. The V2X communications based on direct wireless communications between the V2X entities, such as those illustrated in FIG. 1, do not require any network infrastructure for the V2X entities to directly communicate and enable low latency communications, which is advantageous for precise positioning. Accordingly, such direct wireless V2X communications may be used to enhance the performance of current positioning techniques, such as TOA, TDOA, or OTDOA.

Accordingly, as shown in FIG. 1, ego vehicle 102 may communicate with and/or receive information from various entities coupled to wireless network 120. For example, ego vehicle 102 may communicate with and/or receive information from AS 110 or cloud-based services over V2N. As another example, ego vehicle 102 may communicate with RSU 122 over communication link 123. RSU 122 may be a Base Station (BS) such as an evolved NodeB (eNB), or a next Generation nodeB (gNB), or a roadside device such as a traffic signal, toll, or traffic information indicator. As shown in FIG. 1, RSU 122 may include functionality to connect via Internet Protocol (IP) layer 126 and subnet 128 to BS 124. BS 124 (e.g. an eNB/gNB) may communicate via Uu interface 125 with AS 110 and/or with other vehicles via a Uu interface (not shown). Further, BS 124 may facilitate access by AS 110 to cloud based services or AS 130 via IP layer 126 and network 120.

In some embodiments, ego vehicle 102 may access AS 110 over V2I communication link 112-1 or communicate with target vehicles 104-4 and/or 104-1 over Vehicle-to-Vehicle (V2V) communication links 105-1 and 105-2, respectively. In some embodiments, ego vehicle 102 may also receive V2V communications (e.g. passively) that may be broadcast by one or more other target vehicles 104. In some embodiments, target vehicle 104-1 may broadcast, transmit, or exchange information with ego vehicle 102 over V2V communication link 105-1, where the information may include vehicle characteristic and other information related to target vehicle 104-1. The information transmitted by target vehicle 104-1 may pertain to vehicular parameters of target vehicle 104-1 and may include one or more of: (i) a vehicle classification (e.g. make, model, vehicle type such as sedan, hatchback, coupe, truck, motorcycle, etc.) (ii) vehicle characteristics (e.g. vehicle dimensional information, vehicle form factor, a 3D model of the vehicle, one or more vehicle attributes, etc.), (iii) vehicle identification information (e.g. license plate number, color, SW type/version (e.g. of an ADS system), trip related information (e.g. passenger count, current location, destination), (iv) vehicle behavioral attributes (vector acceleration, velocity, location, braking status, turn light status, reverse lights status, etc.) and (v) other information (e.g., urgency code—such as late to work, vehicle use code such as newspaper delivery, garbage truck, sightseeing/tourism, taxi, etc.). The term "license plate number" or "vehicle license plate number" is used generically herein to refer to characters and/or symbols and/or other information that may appear on vehicle license plates (and is not limited to "numbers"). As shown in FIG. 1, one or more V2X capable target vehicles, such as target vehicles 104-2 and/or 104-4, may also communicate with various entities coupled to wireless network 120. For example, as shown in FIG. 1, target vehicle 104-2 may communicate with BS 122 over communication link 127-2, while target vehicle 104-1 may communicate BS 122 over communication link 127-1, and target vehicle 104-4 may communicate with AS 110 over V2I link 112-2. In some embodiments, information relayed by target vehicles 104-1 (e.g. environmental conditions such as an NLOS road hazard) may be communicated to ego vehicle 102 directly via V2V link 105, and/or communicated to RSU 122 over V2I communication link 127 and then relayed to ego vehicle 102 over V2I communication link 123.

AS 110, for example, may be an entity supporting V2X applications that can exchange messages (e.g. over V2N links) with other entities supporting V2X applications. AS 110 may wirelessly communicate BS 124, which may include functionality for an eNB and/or a gNB. For example, in some embodiments, AS 110 may provide information in response to queries from an ADS system and/or an application associated with an ADS system in ego vehicle 102.

AS 110 (and/or AS 130) may be used to provide vehicle related information to vehicles including ego vehicle 102. In some embodiments, AS 110 and/or AS 130 and/or cloud services associated with network 120 may use a database with vehicular information to provide information about target vehicles 104 in response to one or more queries by ego vehicle 102. For example, AS 110 and/or AS 130 and/or cloud services associated with network 120 may provide target vehicle characteristics (e.g. physical attributes, dimensional information, form factors, 3D models etc.) corresponding to one or more target vehicles 104 in response to a query from ego vehicle 102. The query from ego vehicle 102 may, for example, include a target vehicle classification (e.g. a make and model number), and/or vehicle license plate information (e.g. in jurisdictions where such information is publicly available) pertaining to the one or more target vehicles 104. For example, the target vehicle classification (e.g. make and model number) of a target vehicle 104-2 may be used by AS 110 and/or AS 130 and/or cloud services associated with network 120 to retrieve target vehicle characteristics (e.g. physical attributes, dimensional information, 3D model information, etc.) for target vehicle 104-2 and send the retrieved target vehicle characteristic information for target vehicle 104-2 to ego vehicle 102. As another example, license plate information of a target vehicle 104-2 may be used by AS 110 and/or AS 130 and/or cloud services associated with network 120 to retrieve target vehicle characteristics (e.g. physical attributes, dimensional information, 3D model information, etc.) for target vehicle 104-2 and send the retrieved target vehicle characteristic information for target vehicle 104-2 to ego vehicle 102.

In some embodiments, ego vehicle 102 may send captured images of target vehicle(s) 104 to AS 110 and/or AS 130 and/or cloud services associated with network 120, which may: (a) determine a vehicle classification based on the received images, and (b) obtain and/or provide vehicle characteristic information pertaining to target vehicle(s) 104 to ego vehicle 102. In some embodiments, information from database(s) coupled to AS 110/130 may be retrieved, stored locally on ego vehicle 102, and updated periodically by ego vehicle 102. In some embodiments, the vehicle databases may include vehicle characteristic information for the types of vehicles prevalent in a locale (e.g. based on government agency info, data gathered from other vehicles, commercially available information, etc.).

In some embodiments, ego vehicle 102 and/or AS 110 and/or AS 130 and/or cloud services associated with network 120 may utilize captured images of a target vehicle (e.g. target vehicle 104-2) received from multiple vehicles (e.g. in addition to images captured by ego vehicle 102) to generate target vehicle characteristic information (vehicle dimensional information for target vehicle 104-2 and/or a 3D model of target vehicle 104-2 and/or determine target vehicle features or target vehicle attributes for target vehicle 102). For example, based on timestamps associated with the crowdsourced captured images of target vehicle 104-2, positional attributes associated with the target vehicle 104-2 for each image, and/or positional information associated with vehicles at the time of capture of each image in the plurality of images, an entity (e.g. AS 110 and/or AS 130 and/or cloud services associated with network 120) may determine that the images pertain to target vehicle 104-2 and generate target vehicle characteristic information (e.g. vehicle dimensional information and/or a 3D model and/or determine attributes for unique identification) of target vehicle 104-2. The updated vehicle characteristic information may be provided to ego vehicle 102 (e.g. by AS 110 and/or AS 130 and/or cloud services associated with network 120) to facilitate subsequent target vehicle classification or identification (e.g. when the relative pose of target vehicle 104-2 with respect to ego vehicle 102 may have changed). As another example, when vehicle license plate information for target vehicle 104-2 is available (e.g. from captured images of target vehicle 104-2), the plurality of target vehicle images (e.g. received from multiple vehicles) may be associated with target vehicle 104-2 (e.g. based on the vehicle license plate information) and used to update vehicle characteristic information for target vehicle 104-2. In some embodiments, the storing (e.g. by ego vehicle 102 and/or AS 110 and/or AS 130 and/or cloud services associated with network 120) of crowdsourced target vehicle images (e.g. of target vehicle 104-2) may facilitate maintenance (e.g. by ego vehicle 102 and/or AS 110 and/or AS 130 and/or cloud services associated with network 120) of updated vehicle characteristic information for a target vehicle. In some embodiments, the updated vehicle characteristics may be used to facilitate vehicle identification (e.g. by ego vehicle 102 and/or AS 110 and/or AS 130 and/or cloud services associated with network 120).

For entities communicating directly in the V2X wireless communication system 100, each entity may provide V2X information, such as an identifier for the V2X entity, as well as other information in messages such as Cooperative Awareness Messages (CAM) and Decentralized Notification Messages (DENM) or Basic Safety Message (BSM), which may be used by ADS in ego vehicle 102 (and other vehicles 104). Cooperative Awareness Messages (CAMs) may provide information of presence, position, and other status information to neighboring vehicles 104. DENMs may be used to directly alert vehicles of detected events. In some embodiments, BSMs, which may be transmitted over DSRC, may include information about the vehicle such as vehicle size, vehicle position, speed, vehicle heading, acceleration, braking system status etc.

Additionally, as shown in FIG. 1, entities coupled to communication network 120 may communicate using indirect wireless communications, e.g., using a network based wireless communication between entities, such as Wireless Wide Area Networks (WWAN). For example, entities may communicate via the Long Term Evolution (LTE) network, where the radio interface between the user equipment (UE) and the eNodeB is referred to as LTE-Uu, or other appropriate wireless networks, such as "3G," "4G," or "5G" networks. In addition, entities (e.g. ego vehicle 102) coupled to communication network 120 may receive transmissions that may be broadcast or multicast by other entities (e.g. target vehicle(s)) 1040 coupled to the network. As illustrated, the ego vehicle 102 may wirelessly communicate with various other V2X entities, such as the AS 110 through a network infrastructure 120, which, for example, may be a 5G network. When communication network 120 is a 5G network, a 5G capable ego vehicle 102 or one or more 5G capable target vehicles 104, for example, may wirelessly communicate with BS 124 (e.g. a gNB) or RSU 122 via an appropriate Uu interface.

In some implementations, RSU 122 may directly communicate with the AS 110 via communication link 116. RSU 122 may also communicate with other base stations (e.g. gNBs) 124 through the IP layer 126 and network 128, which may be an Evolved Multimedia Broadcast Multicast Services (eMBMS)/Single Cell Point To Multipoint (SC-PTM) network. AS 130, which may be V2X enabled, may be part of or connected to the IP layer 126 and may receive and route information between V2X entities in FIG. 1 and may also receive other external inputs (not shown in FIG. 1).

Ego vehicle 102 and one or more target vehicles 104 may also receive signals from one or more Earth orbiting Space Vehicles (SVs) 180 such as SVs 180-1, 180-2, 180-3, and 180-4 collectively referred to as SVs 180, which may be part of a Global Navigation Satellite System. SVs 180, for example, may be in a GNSS constellation such as the US Global Positioning System (GPS), the European Galileo system, the Russian Glonass system, or the Chinese Compass system. In accordance with certain aspects, the techniques presented herein are not restricted to global satellite systems. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS/GNSS may include any combination of one or more global and/or regional navigation satellite systems and/or augmentation systems, and SPS/GNSS signals may include SPS, SPS-like, and/or other signals associated with such one or more SPS/GNSS. The SPS/GNSS may also include other non-navigation dedicated satellite systems such as Iridium or OneWeb. In some embodiments, ego vehicle 102 and one or more target vehicles 104 may be configured to receive signals from one or more of the above SPS/GNSS/satellite systems.

Figure 2A:
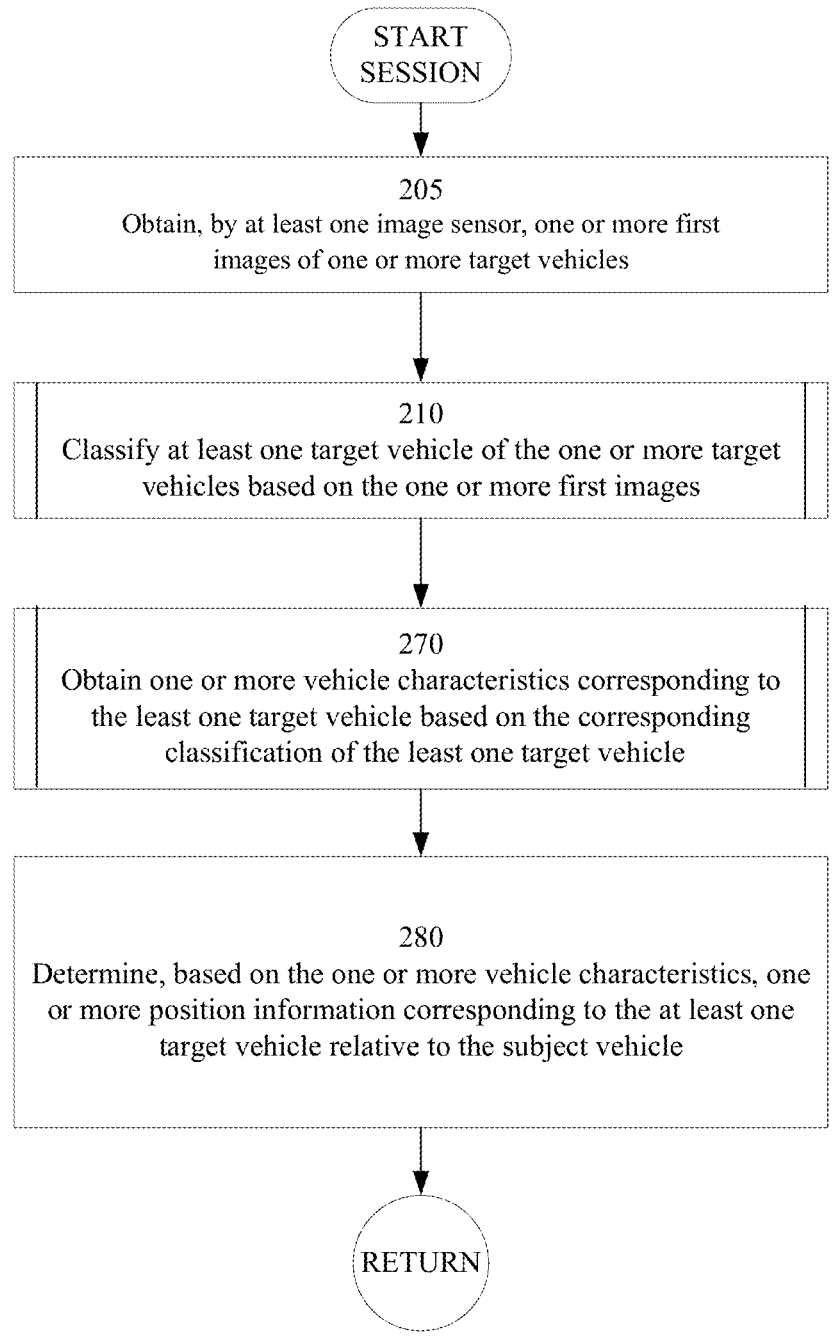
FIGS. 2A-2D and 2F show flowcharts of an example method to facilitate ADS decision making.

FIG. 2A shows a flowchart of an example method 200 to facilitate ADS decision making. Method 200 may facilitate target vehicle classification and/or localization. In some embodiments, method 200 may be performed by one or more of: (a) ego vehicle 102, and/or (b) an ADS associated with ego vehicle 102, and/or (c) a mobile device and/or other components in ego vehicle 102, using one or more processors (e.g. on board ego vehicle 102 and/or on the mobile device in ego vehicle 120). In some embodiments, method 200 may use information obtained from image sensors on ego vehicle 102, and one or more of: information received over V2X (e.g. received from a target vehicle 104 or another entity couple to network 120), information from an SPS receiver coupled to ego vehicle 102, and/or from other sensors (e.g. radar, acoustic sensors, ultrasonic sensors, etc.). In some embodiments, method 200 may be performed by processors (e.g. on ego vehicle 102), which may be communicatively coupled to image sensors and memory on ego vehicle 102. The communicative coupling between the processor(s), image sensor(s), and memory may be wired (e.g. optical, electronic, via a bus, etc.) and/or wireless. Further, the communicative coupling between the processor(s), image sensor(s), and memory on ego vehicle 102 may be direct or indirect (e.g. use one or more intermediaries).

In some embodiments, method 200 may facilitate determination of positional information corresponding to one or more target vehicles 104. In some embodiments, a display on ego vehicle 102 may be updated with representations (e.g. a form factor and/or 3D model) of the target vehicles 104 based on the corresponding positional information, corresponding target vehicle classifications, and/or target vehicle characteristics.

In block 205, one or more first images of one or more target vehicles 104 may be obtained using at least one image sensor (e.g. camera(s), lidar, etc.). For example, the one or more first images may be obtained by image sensor(s) on (or coupled to) ego vehicle 102. In some embodiments, the one or more images may be obtained from multiple image sensors and may be stitched together based on image sensor pose and other image sensor parameters. In some embodiments, vehicles may be considered target vehicles (e.g. by an ego vehicle 102) based upon a determination that the corresponding distance from the target vehicle to the ego vehicle is less than a threshold. As one example, proximity of one or more vehicles to ego vehicle 102 may be determined based on the obtained images and/or other sensor input.

In some embodiments, the image sensor pose (or position and orientation of the image sensor) at the times of capture of the one or more first images may be recorded. In addition, one or more image sensor parameters such as camera focal length etc. at the time of image capture may be determined and stored. In some embodiments, the image sensor may include a depth sensor, which may be used to determine a distance from ego vehicle 102 to a corresponding target vehicle 104 at the time of image capture. In some embodiments, input from one or more other sensors such as radar, ultrasonic sensors, etc. may be used (additionally or alternatively) to determine the corresponding initial distances to the one or more target vehicle at the time of image capture. At a given time, image 305 may capture one or more images of the visible portions of target vehicles 104. The captured portion of a target vehicle may depend on the pose of the target vehicle relative to the ego vehicle 102 and/or the presence of obstructions (e.g. other intervening vehicles, road signs, etc.) between the target vehicle 104 and ego vehicle 102. Thus, one or more target vehicles may be partially visible at the time of image capture. For example, one or more target vehicles, such as target vehicle 104-1 (in FIG. 1A), may be partially occluded from image sensors on ego vehicle 102.

Figure 3A:
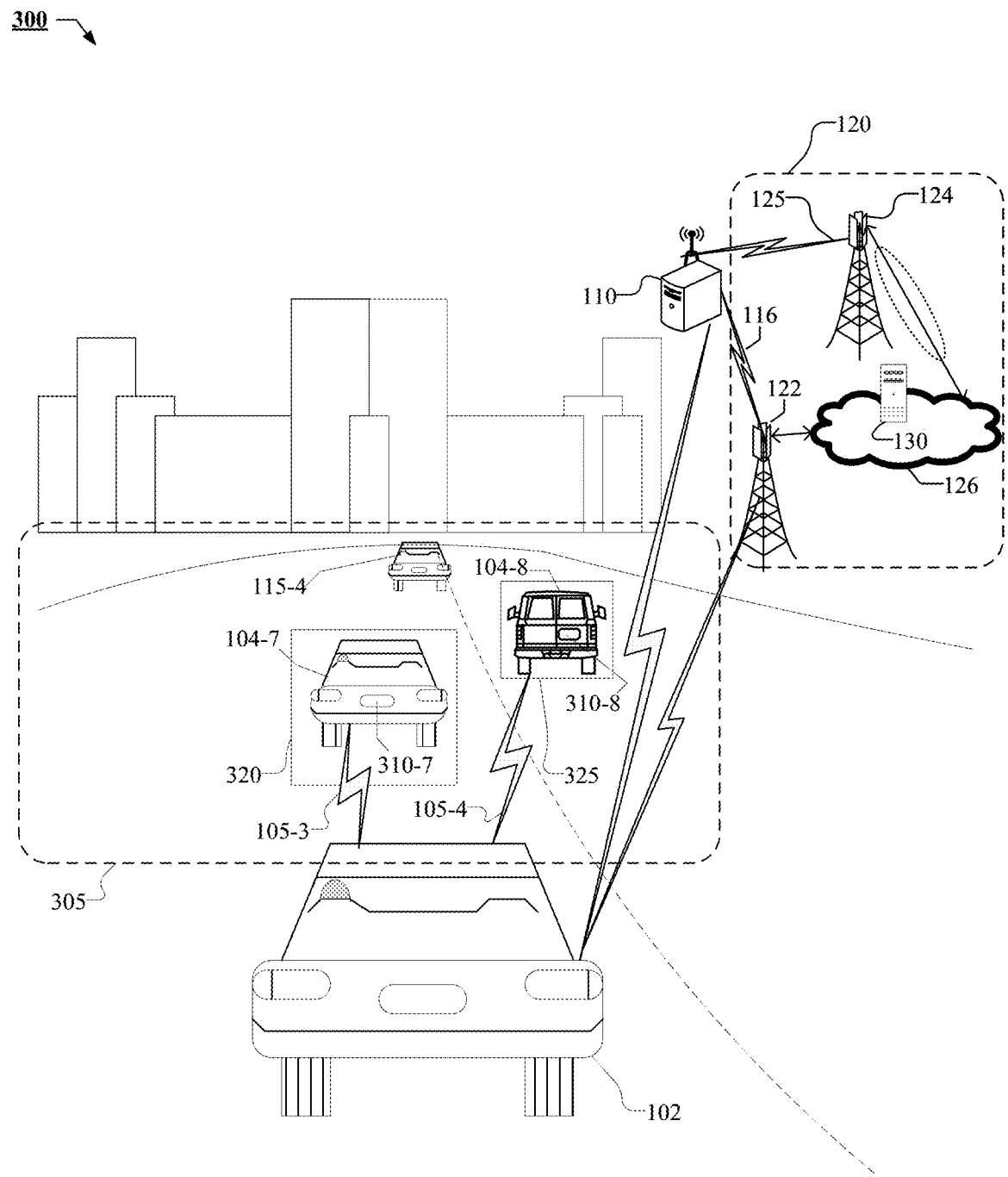
FIG. 3A illustrates a system to facilitate autonomous driving in accordance with some disclosed embodiments.

FIG. 3A illustrates a system 300 to facilitate autonomous driving in accordance with some disclosed embodiments. In some embodiments, image sensors on ego vehicle 102 may obtain one or more first images 305 of one or more target vehicles 104 proximate to ego vehicle 102. For example, an image sensor onboard ego vehicle 102 may obtain an image 305, which may include image 320 of target vehicle 104-7 and another image 325 of target vehicle 104-8. In some embodiments, image 320 may be a cropped image of target vehicle 104-7 or a bounding box of an image of target vehicle 104-7 (e.g. after detection of target vehicle 104-7 in image 305). Similarly, image 325 may be a cropped image of target vehicle 104-8 or a bounding box of an image of target vehicle 104-8 (e.g. after detection of target vehicle 104-8 in image 305). Thus, in some instances, a single image (e.g. image 305) obtained by the image sensor may comprise images (320 and 325) of a plurality of target vehicles (e.g. target vehicles 104-7 and 104-8, respectively).

In some embodiments, the one or more images may be obtained from multiple image sensors and may be stitched together based on image sensor pose and other image sensor parameters. An image (e.g. image 305) may also include images of one or more vehicles (e.g. vehicle 115-4) that are not considered target vehicles (e.g. because they are not proximate to ego vehicle 102 and/or considered as not pertinent for other reasons). Target vehicles 104 in image 305 may be determined using various techniques such as feature detection. In general, at a given time, image 305 may capture a visible portion of one or more target vehicles 104.

Referring to FIG. 2A, in block 210, at least one target vehicle of the one or more target vehicles 104 may be classified based on the one or more first images. The term classification may refer to determination of a generic vehicle type (e.g. car, truck, van, tractor-trailer, scooter, motorcycle, bicycle, stroller, personal transporter, etc.) or a more detailed classification (e.g. make/model, year, and/or trim). Classification may be hierarchical. For example, a vehicle may be classified as a car (top level), then by body type e.g. a sedan, or coupe, or hatchback, or convertible, etc. and further by make (e.g. Honda) and model (e.g. 2016 Accord) and by trim (e.g. "2016 Honda Accord SE").

In some embodiments, images captured by the image sensor may be warped based on the image sensor pose at the time of capture and the warped images may be compared to one or more the second images. The second images of vehicles may be stored in a database in the ego vehicle 102, and/or received from a target vehicle 104 (e.g. over V2V), and/or received from an entity coupled to network 120 (e.g. over V2X). The term "warp" as used herein refers to the geometrical transformation of an image by performing one or more of: translation, rotation, scaling, and/or other affine operations on the image and/or shearing. Affine transformations preserve points, straight lines, and planes in (the pre-affine transform) images. For example, parallel lines (pre affine transformation) may remain parallel after an affine transformation. Affine transformations may be used to correct for geometric distortions or deformations that may occur with non-ideal camera angles. Warping may facilitate image and/or feature matching operations.

In some embodiments, various well known techniques may be used for image and/or feature matching operations including Scale Invariant Feature Transform (SIFT) techniques or variants thereof such as Rotation Invariant Feature Transform (RIFT), Gradient Location Oriented Histogram (GLOH), Principal Component Analysis-SIFT (PCA-SIFT), etc. Image matching techniques may identify features such as corner points, edges etc. in an image frame. SIFT based descriptors and variants (which include a variety of computationally efficient modified SIFT descriptors) thereof, facilitate robust tracking and feature correspondence between images even in the face of relatively large viewpoint changes. When SIFT based descriptors are used, for example, SIFT keys from a stored image may matched with SIFT keys in a captured image. In some embodiments, various other techniques may be used for feature detection. For example, techniques based on Speeded-Up Robust Features ("SURF"), or variants thereof, hybrid point and/or edge detection techniques, etc. may be used for in part for feature detection and/or image matching. A vehicle classification may be determined based on the degree to which the warped images of target vehicle 104 (or features in the warped image of a target vehicle 104) match second images (or corresponding features in the second images) of a vehicle (make and model). In some embodiments, machine learning (ML) or other artificial intelligence (AI) based techniques may be used, alternatively or additionally, to classify vehicles based on captured images. For example, convolutional neural networks (CNNs) or deep learning neural networks may be used to determine vehicle classifications based on captured images.

In instances where a plurality of second images associated with different vehicle classifications are likely matches, then, (a) the closer matching classification may be selected; or (b) the more popular of the matching vehicle classifications may be selected as representing the corresponding target vehicle. Popularity may be based on information pertaining to the number of vehicles sold (or registered) at a current location of ego vehicle 102, in some region (e.g. statewide or county wide). Popularity may also be based on the proportion of certain vehicles (makes and/or model) in the area recorded over some time period. When a vehicle make and/or model cannot be determined, the target vehicle may be classified by vehicle type (e.g. sedan, van, etc.).

In some embodiments, processor(s) on ego vehicle 102 may be coupled to a database of second images of vehicles. In some embodiments, each second image may be associated with a vehicle classification such as a vehicle type, body style, make model number, trim, etc. In some embodiments, target vehicle 104-$j$ may be classified based on a match of one or more first images comprising target vehicle 104-$j$ with a corresponding second image. In some embodiments, input from one or more sensors (e.g. image sensors, radar, ultrasonic sensors, etc.) may be used to estimate an initial orientation of target vehicles relative to the ego vehicle. The estimated initial orientation may be used to rotate or warp a corresponding target vehicle image prior to comparison with the second images, or vice versa.

Figure 2B:
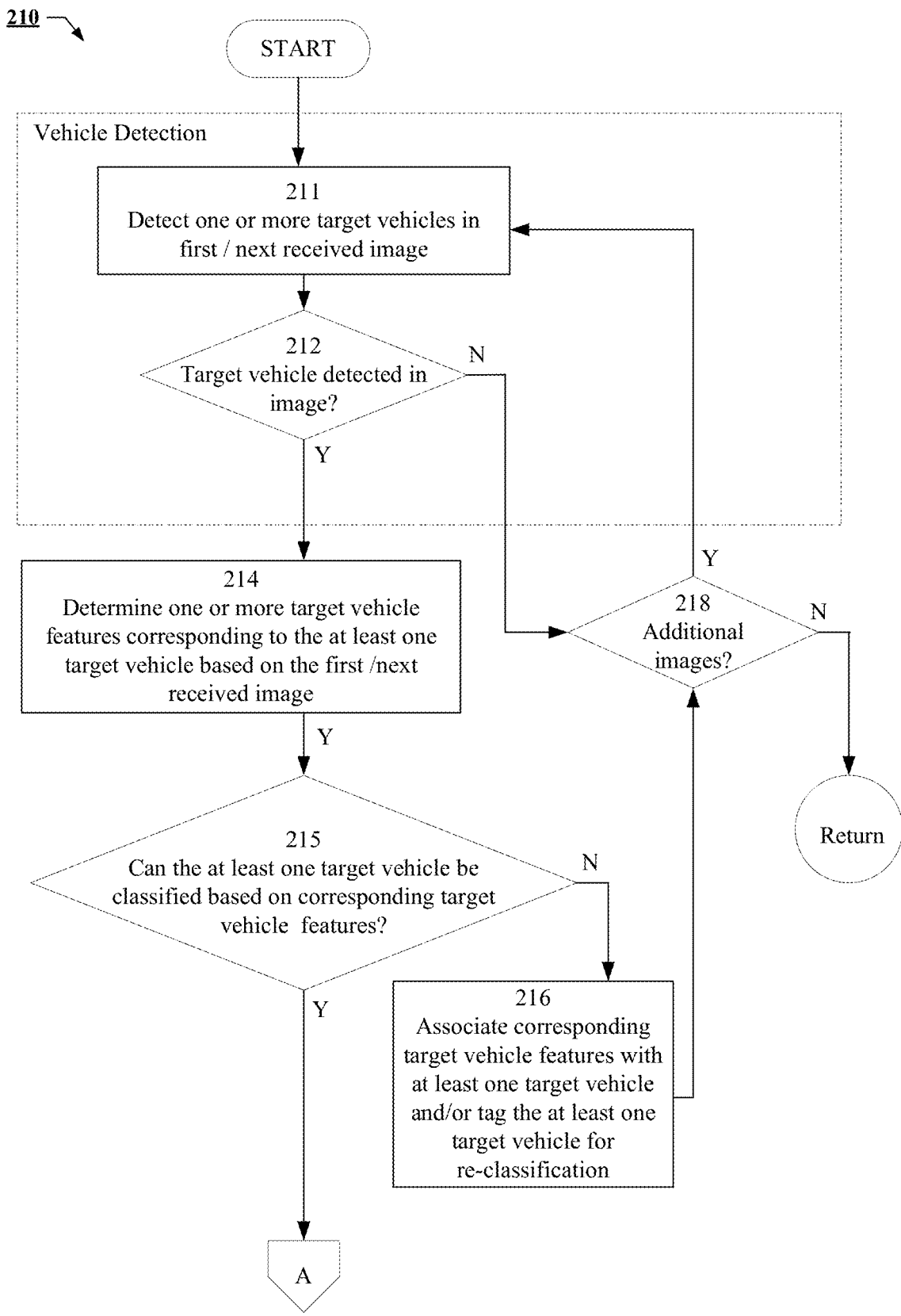

FIG. 2B shows a flowchart associated with exemplary block 210 to detect and classify at least one target vehicle of the one or more target vehicles 104 in accordance with embodiments disclosed herein. In some embodiments, target vehicles may be classified after detection. In some embodiments, target vehicle detection and classification may occur in parallel.

In block 211 in FIG. 2B, one or more target vehicles in a first or next received image may be detected. In some embodiments, computer vision and/or image recognition techniques (hereinafter "CV techniques") may be used to detect vehicles in images. In some embodiments, in block 211, CV techniques for object recognition may be used to detect vehicle in the first or next image. For example, salient features (e.g. edges, gradients, gradient direction, etc.) may be extracted from the first or next image to detect target vehicles. The extracted salient features from the first or next image may be compared (e.g. using mathematical or statistical techniques) with stored features to determine if one or more vehicles are present in the first or next image. In some embodiments, a unique label or key may be assigned to each target vehicle when the target vehicle is first detected. The label or key may be used to associate corresponding target vehicle features with the target vehicle.

In some embodiments, Artificial Intelligence (AI) techniques (e.g. based on offline Machine Learning) may be used to detect vehicles. Offline machine learning may include supervised learning. For example, a training set may comprise labeled images of various types of vehicles in a variety of poses relative to the camera. The training set may be used in a supervised setting to train a ML algorithm offline to detect vehicles. Offline ML techniques may be used to build an AI/mathematical model for vehicle recognition based on the training set. In some embodiments, during runtime, one or more target vehicles in a first or next received image may be detected based on the machine learned mathematical model developed during the offline phase.

In block 212, if one or more vehicles are detected in the first or next image ("Y" in block 212) then block 214 may be invoked. If no vehicles are detected in the first or next image ("N" in block 212) then, in block 218, it may be determined if there are additional images to be processed. If there are additional images ("Y" in block 218), then, block 211 may be invoked to process the next image. If there are no additional images ("N" in block 218) then, control may return to the calling routine.

If at least one target vehicle was detected in block 214, one or more target vehicle features corresponding to the at least one target vehicle may be determined based on features in the received image using one or more feature matching techniques (e.g. as described herein). Target vehicle features may be determined from salient features (edges, gradients, corner points, colors, etc.) in an image of the at least one target vehicle and may include a combination of physical, structural, ornamental, and/or other features that may be present in the first or next image. In some embodiments, the salient features pertaining to the at least one target vehicle (and extracted from the first or next image) may facilitate subsequent determination of target vehicle type, and/or target vehicle classification, and/or target vehicle unique identification, and/or target vehicle localization.

If the target vehicle features corresponding to the at least one target vehicle (e.g. as determined in block 214) are insufficient for classification of the at least one target vehicle ("N" in block 215) then, in block 216, the currently determined target vehicle features may be associated with the at least one corresponding target vehicle. In some embodiments, the at least one corresponding target vehicle may be tagged for re-classification and block 218 may be invoked to determine if there are additional images. If there are additional images ("Y" in block 218), then, block 211 may be invoked to process the next image. If there are no additional images ("N" in block 218), control may return to the calling routine.

In block 215, if the target vehicle features corresponding to the at least one target vehicle (e.g. as determined in block 214) are adequate for classification of the at least one target vehicle ("Y" in block 215), then block 222 (in FIG. 2C) may be invoked.

Figure 2C:
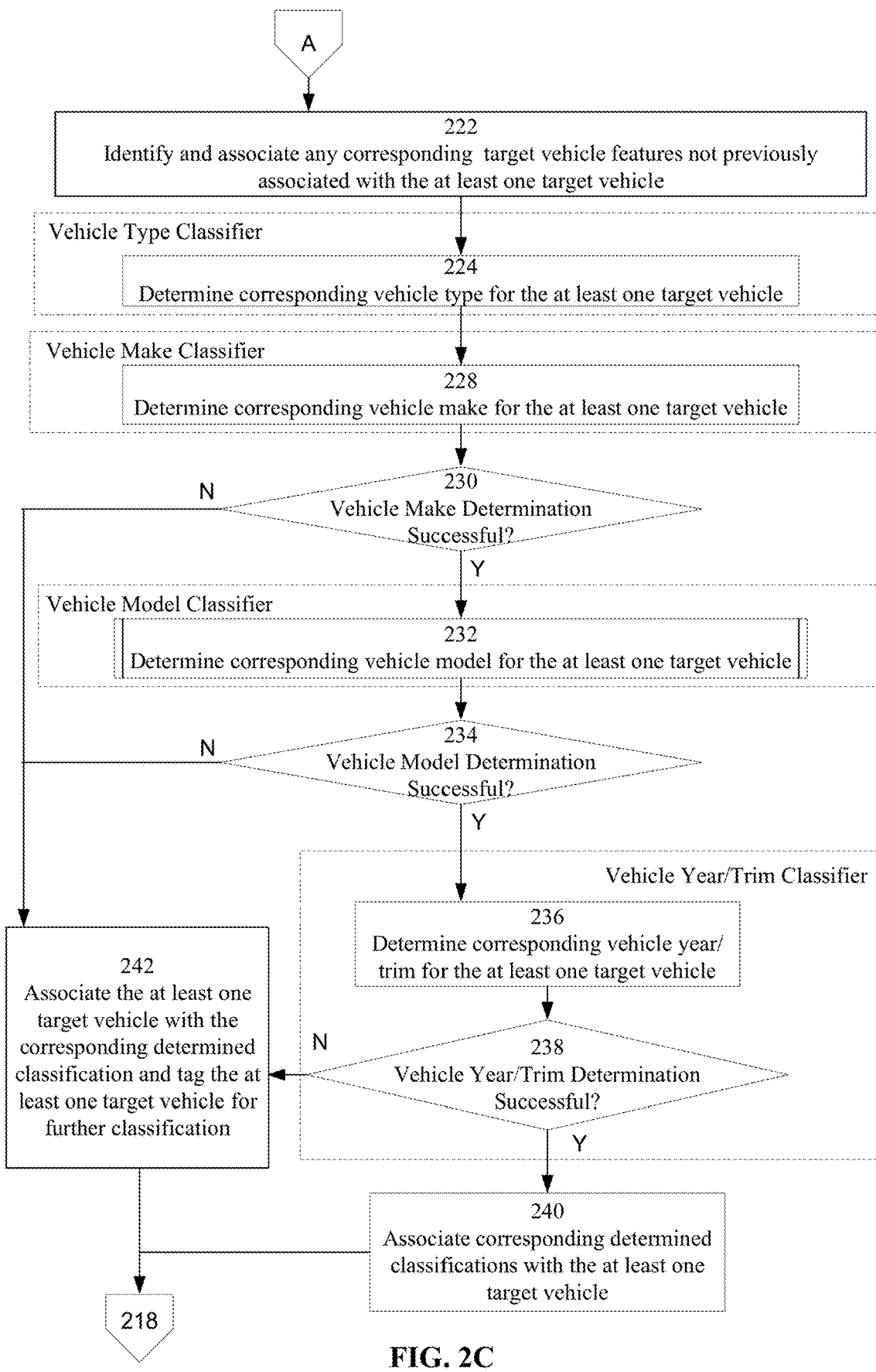

Referring to FIG. 2C, in block 222, any corresponding target vehicle features that were not previously associated with the at least one target vehicle (e.g. in a prior iteration) may be identified and associated with the at least one target vehicle.

In block 224, based on the corresponding target vehicle features associated with the at least one target vehicle, a corresponding vehicle type may be determined for the at least one target vehicle. The corresponding target vehicle type may be one of small car, large car, truck, passenger van, sports utility vehicle (SUV), semi-truck, bus, motorcycle, stroller, bicycle, etc. In some instances, the number of features and/or the quality of features for determination of target vehicle type may be lower than that for determination of a target vehicle model. In some embodiments, block 224 may be performed by a Vehicle Type Classifier module. For example, one or more target vehicle features in the first or next image may be warped based on image sensor pose and compared with generic vehicle type images (e.g. stored by or available to ego vehicle 102) to determine a vehicle type. A generic target vehicle type corresponding to the at least one target vehicle may be determined from the comparison in block 224.

In some embodiments, the Vehicle Type Classifier module (which may form part of block 224) associated with ego vehicle 102 may apply learning and/or transferred learning techniques to classify vehicles using multiple obtained images of the at least one target vehicle (e.g. captured by image sensors coupled to ego vehicle 102, and/or obtained from other proximate vehicles, and/or from AS 110/AS 130 or cloud services coupled to communication network 120). For example, the multiple images obtained by ego vehicle 102 may be stored in a preexisting database, which may include images of various vehicles. The Vehicle Type Classifier module may be trained (e.g. using one or processors, such as Graphical Processing Units (GPUs) and/or other dedicated hardware. As one example, a dedicated inference Application Specific Integrated Circuit (ASIC) or a dedicated inference accelerator ASIC may be used to process Artificial Intelligence (AI) inference workloads to classify vehicles based on the images in the database. In some embodiments, after training, Vehicle Type Classifier module, vehicles may be capable of mapping vehicle parameters to keypoints and classifying target vehicles even in situations where the target vehicle is heavily occluded. In some embodiments, Vehicle Type Classifier module may use transferred learning techniques so that trained models may be transferred (e.g. by ego vehicle 102) to one or more vehicles that are proximate to ego vehicle 102.

In block 228, a corresponding vehicle make for the at least one target vehicle may be determined. In some embodiments, block 228 may be performed by a Vehicle Make Classifier module. For example, when available, a logo and/or name and/or other distinguishing vehicle make feature in the first or next image may be used to determine a corresponding vehicle make for the at least one target vehicle. In some instances, the number of features and/or the quality of features for determination of target vehicle make (or target vehicle type) may be lower than that for determination of a target vehicle model. In some embodiments, the order of blocks 222 and 224 may be changed, and/or the functionality of blocks 222 and 224 may be combined (e.g. to determine target vehicle type and/or target vehicle make).

In block 230, if vehicle make determination was not successful ("N" in block 230), then block 242 may be invoked. In block 242, the at least one target vehicle may be associated with the corresponding determined vehicle type classification. In some embodiments, in block 242, the at least one target vehicle may be tagged for further classification (e.g. based on any subsequent/additional images) and block 218 may be invoked.

If vehicle make determination was successful in block 230 ("Y" in block 230), then block 232 may be invoked. In block 232, a corresponding vehicle model for the at least one target vehicle may be determined. In some embodiments, block 232 may be performed by a Vehicle Model Classifier module.

Figure 2D:
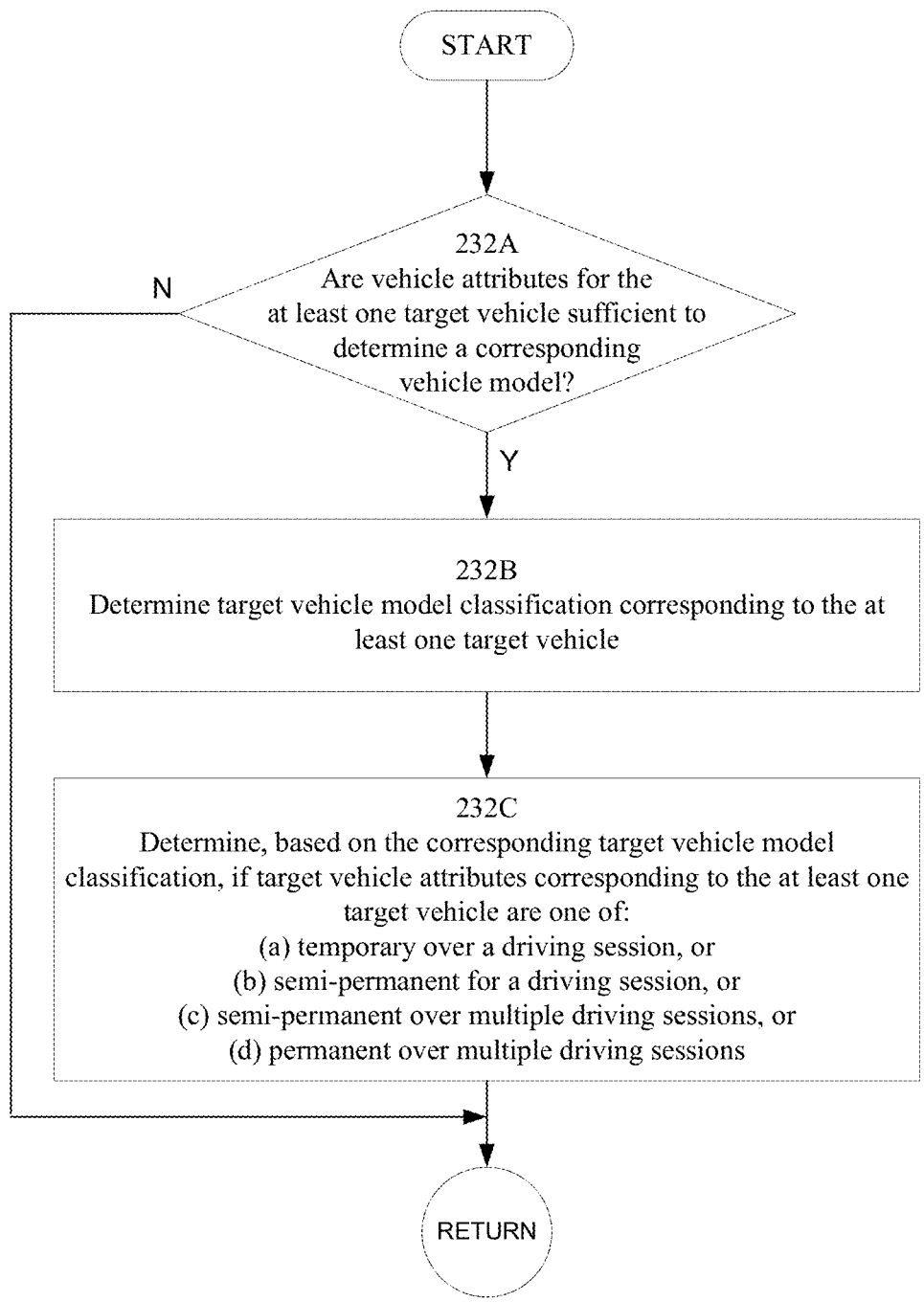

FIG. 2D shows a flowchart associated with exemplary block 232 to determine a vehicle model corresponding to the at least one target vehicle based on features in the received image.

In block 232A, if vehicle features corresponding to the at least one target vehicle are sufficient to determine a corresponding target vehicle model ("Y" in block 232A) then, in block 232B, a target vehicle model classification corresponding to the at least one target vehicle may be determined. For example, target vehicle features may be warped based on the image sensor pose at the time of capture and the warped images may be compared to one or more second images (e.g. stored in a database coupled to ego vehicle 102). In some embodiments, AI/ML techniques may be used (alternatively or additionally) to determine target vehicle model information. For example, a mathematical model for vehicle classification and/or vehicle model determination based on AI/ML techniques may be created offline. The mathematical model may be downloaded and/or stored by ego vehicle 102 (and/or a device within ego vehicle 102) and may be used to determine a corresponding target vehicle model for the at least one target vehicle.

In block 232C, based on the corresponding target vehicle model classification, target vehicle attributes corresponding to the at least one target vehicle may be determined and categorized as one of: (a) temporary over a driving session, or (b) semi-permanent for a driving session, or (c) semi-permanent over multiple driving sessions, or (d) permanent over multiple driving sessions, or (e) some combination of temporary, semi-permanent, and/or permanent attributes. The driving sessions in (a)-(e) above pertain to ego vehicle driving sessions. Categorization of target vehicle attributes in (a)-(e) above may facilitate one or more of: further detailed target vehicle classification (e.g. by year/trim), target vehicle tracking and localization, and may also facilitate association of a target vehicle characteristic such as an appropriate form factor with the target vehicle as outlined further herein.

For example, based on the target vehicle model determination, corresponding second images of the target vehicle model (e.g. stored in a database coupled to ego vehicle 102) may be compared with first target vehicle images (e.g. from image sensor(s) on ego vehicle 102) to determine and categorize vehicle attributes. As one example, the first images may be warped based on the image sensor pose at the time of capture and differenced from corresponding stored images of the target vehicle model. As another example, based on the determined target vehicle model, AI/ML based techniques may be used to determine and categorize vehicle attributes. In some embodiments, attribute categories may further include target vehicle attributes used to determine the target vehicle model and/or target vehicle attributes that may be used to attach a target vehicle characteristic (e.g. a form factor based on the determined target vehicle model and pose).

Figure 2E:
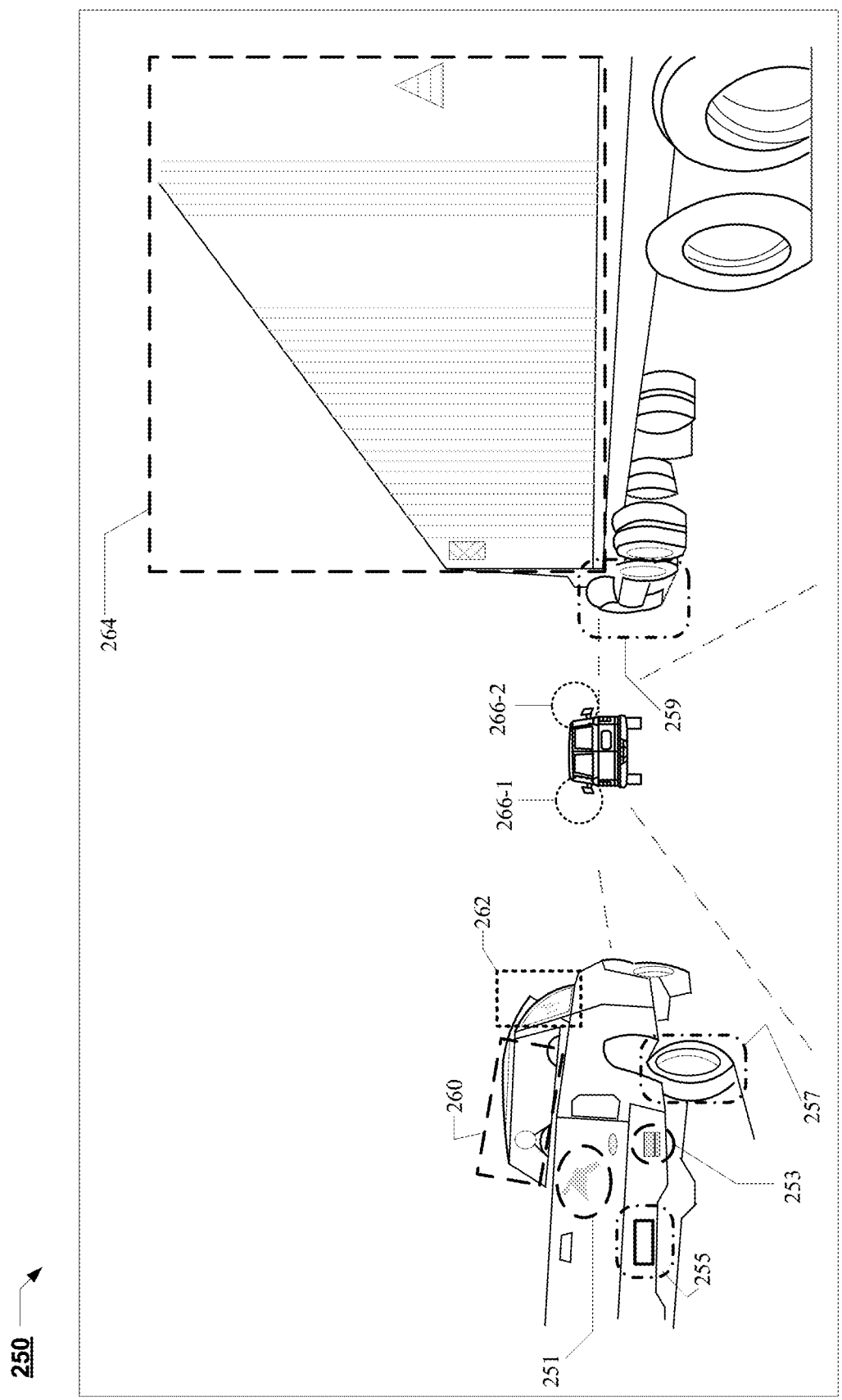
FIG. 2E illustrates attributes associated with target vehicles for attribute categorization.

FIG. 2E shows an image 250 illustrating some example categories of target vehicle attributes. Attributes considered temporary over a driving session may include attributes that may change during an ego vehicle driving session. For example, FIG. 2E shows passenger window in rolled up state 262, which may change during the driving session. Examples of target vehicle attributes that may be considered temporary over a driving session include dirt/frost/snow on the target vehicle, the up up/down state of one or more windows, windshield wiper motion state, signal light state, brake light state, convertible top deployment state (for a convertible), sunroof open/closed state, spoiler up/down state (e.g. for a Porsche), a passenger count (e.g. for a vehicle used for public transportation), target vehicle location, target vehicle motion state, etc.

Attributes considered semi-permanent over a driving session may include attributes that typically do not change or are unlikely to change during a single ego vehicle driving session. For example, FIG. 2E shows passenger count 260 and freight container 264, which may be considered as semi-permanent or unlikely to change over a driving session. Examples of target vehicle attributes that may be considered semi-permanent for a driving session include visible cargo (e.g. surfboard, ladder, construction material, etc.) on a target vehicle, passenger count (on private vehicles), freight containers, etc.

Attributes considered semi-permanent over multiple driving sessions may include target vehicle attributes that typically do not change or are unlikely to change over multiple ego vehicle sessions. For example, FIG. 2E shows vehicle damage 251 and bumper sticker 253, which are attributes that likely to continue over multiple driving sessions. Examples of target vehicle attributes that may be considered semi-permanent over multiple driving sessions include window stickers, bumper stickers, window tinting, vehicle damage (dents, etc.).

Attributes considered permanent over multiple driving sessions may include attributes that are typically permanent or likely to be permanent. For example, FIG. 2E shows permanent attributes such as vehicle license plate 255, tire rim 257, fuel tank 259, etc. Examples of target vehicle attributes that may be considered permanent include roof racks, aftermarket car kits (e.g., modifications to lights, panels, spoilers), vehicle color, tire rims, manufacturer logo and/or model information on vehicle, normal wear and tear, etc.

In some embodiments, one or more target vehicle attributes may further be categorized as symmetric. Symmetric features include features that are symmetric about an axis (e.g. horizontal, longitudinal, and/or vertical axis.). For example, FIG. 2E shows example symmetric attributes left side mounted rear view mirror 266-1 and right side mounted rear view mirror 266-2, which are symmetric across the longitudinal axis of the corresponding target vehicle. Examples of symmetric attributes include tires, tire rims, taillights, brake lights, headlights, fog lights, etc.

Determining whether target vehicle attributes are: temporary over a session, or semi-permanent over a driving session, or semi-permanent over multiple driving sessions, or permanent; and/or as symmetric may facilitate one or more of: target vehicle tracking, further classification, unique identification and/or target vehicle localization. For example, features that are semi-permanent over driving session or semi-permanent over multiple driving sessions, or permanent, may be used to further classify and/or uniquely identify a target vehicle. As one example, if a target vehicle includes semi-permanent vehicle damage (e.g. damage 251 in FIG. 2E), the damage may be determined by differencing relative to a stored second image and used to uniquely identify the target vehicle (e.g. in a subsequent step). As another example, a permanent feature such as a tire rim or tail light form factor may be used to facilitate vehicle model determination. As a further example, when a target vehicle is associated with semi-permanent attributes such as passenger count 260, the passenger count may be used in conjunction with other attributes to uniquely identify the corresponding target vehicle (e.g. by differentiating the target vehicle from another similar vehicle with a different passenger count). In some embodiments, features classified as temporary over a driving session may be ignored for classification purposes.

In some embodiments, vehicle attributes categorized as symmetric may be used to attach a vehicle characteristic (e.g. a form factor based on the target vehicle model). For example, a vehicle database (e.g. coupled to ego vehicle 102) may indicate whether an attribute is symmetric, which would facilitate correlation of real-world target vehicle attributes (e.g. obtained from first images captured by image sensors) with stored vehicle attributes (e.g. in stored second images). In some embodiments, a database of vehicle attributes and vehicle attribute categorization may be obtained from a service provider (e.g. an application service provider and/or vehicle manufacturers). In some embodiments, offline ML techniques may be used to determine a mathematical model to determine and categorize vehicle attributes based on a training set of real world images. The mathematical model may be used at runtime to determine and categorize target vehicle attributes from captured images. In some embodiments, a combination of image recognition techniques and AI/ML models may be used to determine and categorize target vehicle attributes.

In some embodiments, categorizing attributes as symmetric may facilitate error-correction (or confirmation) when an AI/ML based attribute categorization is used. For example, symmetric attributes may be viewed as more likely to be associated with permanent attributes. Thus, symmetric attributes (e.g. taillights) may be viewed as more likely to facilitate further vehicle classification relative to an asymmetric attribute (e.g. a bumper sticker that typically is not symmetrical). In some embodiments, symmetry may be used to correct mis-categorization. For example, if an attribute is categorized as a permanent and symmetric bumper reflector/light, absence of a corresponding symmetric bumper reflector/light may be used to correct the categorization (e.g. to a semi-permanent over multiple driving sessions bumper sticker). As an illustrative example, an attribute (e.g. a white bumper sticker) might be incorrectly identified by an AI/ML based model as a reverse light until the model checks for symmetry and sees no symmetrical counterpart. Conversely, presence of a symmetrical counterpart may be used to confirm identification of the attribute (e.g. when the attribute has been categorized as a reverse light). In some embodiments, symmetric attributes may be used (e.g. in a subsequent step) to facilitate or enhance target vehicle localization (e.g. via triangulation) or as candidates for vehicle characteristic attachment (e.g. for attachment of a target vehicle form factor). Because symmetric features may be sized differently or have different form factors in images based on their relative position/distance from the ego vehicle image sensor(s), such attributes may facilitate or enhance target vehicle pose determination. In FIG. 2D, after determination and/or categorization of target vehicle attributes (e.g. in block 232C), routine 232 may return control to the calling routine.

Referring to FIG. 2C, in block 234, if target vehicle model determination for the at least one target vehicle was successful ("Y" in block 234) then, block 236 may be invoked to determine corresponding target vehicle year/trim for the at least one target vehicle. If target vehicle model determination for the at least one target vehicle was not successful ("N" in block 234) then, the at least one target vehicle may be associated with the corresponding determined vehicle type/make classification. In some embodiments, in block 242, the at least one target vehicle may be tagged for further classification (e.g. for model/year/trim determination based on any subsequent/additional images).

In some embodiments, block 236 may be performed by a Vehicle Year/Trim Classifier module. In some embodiments, functionality associated with Vehicle Year/Trim Classifier module may be incorporated into Vehicle Model Classifier module. In block 236, a corresponding target vehicle year and/or target vehicle trim for the at least one target vehicle may be determined. A vehicle year may be determined based on attributes that distinguish model years. In addition, for many vehicle models, the vehicle may be associated with a "vehicle package" or "vehicle trim," which determine optional features that may be added to a base model. For example, a base "SE" trim for a vehicle model may not include a sunroof, an "XS" trim may include a sunroof and color toned bumpers, and a "Sport"/"XR" trim may include spoilers and/or different wheel rims/tires. In some instances, one or more vehicle colors/color combinations may only be available in specific trims. Thus, a color/color combination associated with a vehicle model may be indicative of target vehicle trim. In some embodiments, the presence or absence of one or more vehicle attributes (e.g. as determined in block 232) may be used determine vehicle trim. In some embodiments, by comparing or differencing a first image (e.g. obtained from image sensors) with second images (e.g. stored in a database coupled to ego vehicle 102) of a base trim for a particular vehicle model, a corresponding trim for the at least one target vehicle may be determined.

In block 238, if target vehicle year/trim determination for the at least one target vehicle was successful ("Y" in block 238) then, block 240 may be invoked. If target vehicle year/trim determination for the at least one target vehicle was not successful ("N" in block 238) then, the at least one target vehicle may be associated with the corresponding determined target vehicle model classification. In some embodiments, in block 242, the at least one target vehicle may be tagged for further classification (e.g. for year/trim determination based on any subsequent/additional images). In some embodiments, the functionality associated with blocks 232 and 236 may be combined.

In block 240, the at least one target vehicle may be associated with the corresponding determined vehicle type, model, and year/trim and block 218 (FIG. 2B may be invoked to commence another iteration and process any additional images.

Referring to FIG. 2A, in some embodiments, in block 210, at least one target vehicle may be classified based on corresponding target vehicle license plate information in the one or more first images. Referring to FIG. 3A, in some embodiments, processor(s) coupled to ego vehicle 102 and/or an ADS associated with ego vehicle 102 may use vehicle license plate information, such as from license plates 310-7 and/or 310-8 to classify at least one target vehicle. For example, ego vehicle 102 may use OCR on an image of target vehicle 104 that includes the license plate 310-7 (or 310-8) of the target vehicle 104-7 (or 104-8) to classify target vehicle 104-7 (or 104-8). In some embodiments, features such as marks (stains, smears, etc.), dents, registration stickers, etc. may also be used (in addition to OCR) to identify a license plate and/or the associated target vehicle. In some embodiments, classification (and/or unique identification) may be performed based on OCR of a partial (e.g. some of the symbols) license plate. In instances where a recently viewed target vehicle (e.g. 104-8) was previously classified (and/or uniquely identified), other vehicle characteristics (e.g. color) may be used in conjunction with a partial match of the vehicle license plate to infer classification and/or unique identification of the target vehicle (e.g. 104-8). For example, if a red Honda Civic with vehicle license plate ABC-123 was recently observed and classified (and/or uniquely identified), then a partial match of the license plate (e.g. "BC-12") of a red Honda Civic within some time window of the prior observation may be used to infer classification (and/or unique identification). In some embodiments, to classify the at least one target vehicle based on vehicle license plate information in the one or more first images, ego vehicle 102 may send the one or more first images to AS 110 and/or to AS 130 and/or to cloud services associated with AS 130, which may perform the vehicle classification (and/or unique identification) and send classification (and/or identification) related information to ego vehicle 102 (e.g. over V2X).

In situations where information associated with vehicle license plates is publicly available (e.g. in jurisdictions where legal/privacy restrictions do not preclude use of vehicle license plate information to determine vehicle classification information), ego vehicle 102 may obtain vehicle classification information for target vehicles 104-7 and/or 104-8 based on the vehicle license plate information as obtained from license plates 310-7 and/or 310-8, respectively. As another example, when visible in captured image 325, a manufacturer logo and/or model name, on the back of vehicle 104-8 (or the front of target vehicle 104-8 when target vehicle 104-8 is to the rear of ego vehicle 102) may be used to classify target vehicle 104-8. Referring to FIG. 2A, in some embodiments, in block 210, a target vehicle classification may be obtained for at least one target vehicle in situations where only a portion of the target vehicle is visible (e.g. based on a logo, license plate, or other distinguishing features) in the one or more first images.

Figure 3B:
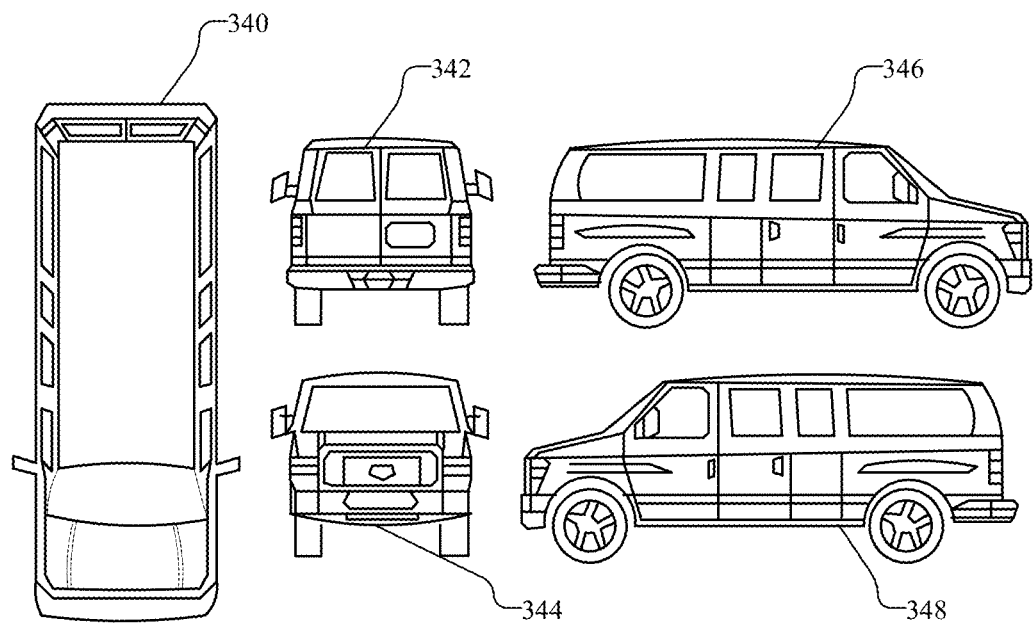
FIG. 3B shows an example vehicle database and some example vehicle images, which may be stored in the vehicle database.

FIG. 3B shows an example vehicle database 330, which may include various fields such as vehicle make, vehicle model, model year, vehicle type, etc. and associated vehicle images. One or more vehicles in vehicle database 330 may be associated with some example vehicle images. Each image may further be associated with a label indicating the view (e.g. front view, rear view, left side view, right side view, top view etc.) and/or a camera pose associated with image capture (e.g. relative to frame of reference centered on the vehicle). For example, the images in vehicle database 330 may comprise front view 344, rear view 342, left side view 348, right side view 346, and top view 340.

As shown in FIG. 3B, vehicle database 330 indicates a row populated with fields and corresponding field values including: Vehicle Make: "Ford"; Vehicle Model: "Econoline"; Model Year: "2014"; Vehicle Type: "Passenger Van"; and image 344 associated with the "Front View field; image 342 associated with the Rear View field, etc. In some embodiments, Front View field, Rear View Field, etc. may include pointers to a one or more corresponding vehicle images, and/or may include pointers to one or more of: Vehicle Detection module, and/or Vehicle Type Classifier module, and/or Vehicle Make classifier module, and/or vehicle Model Classifier module, and/or Vehicle Year/Trim classifier module as appropriate. Thus, vehicle images 340, 342, 344, 346, and 348 may be associated with a vehicle classification (e.g. one or more of: Vehicle Make: Ford; Vehicle Model: Econoline, Model Year 2014, Vehicle Type: Passenger Van, etc.).

In some embodiments, one or more first images of target vehicle 104-8 (e.g. image 325) may be compared with one or more second images in vehicle database 330 to determine a matching image. In some embodiments, a second image in the database of vehicle images that corresponds most closely to a first image (e.g. image 325 of the target vehicle 104-8) may be selected as the matching image. For example, image 342 may be selected as the matching image. In some embodiments, the vehicle images in the database of vehicle images may also be associated with feature descriptors, which may mathematically describe distinguishing features in corresponding images.

Referring to FIG. 2A, in block 210, for example, based on the match, a vehicle classification (e.g. type: van; make: Ford; model: 2014 Econoline; etc.) associated with image 342 may be determined and associated with target vehicle 104-8. In some embodiments, the second images of vehicles may form part of vehicle recognition assistance information (VRAI) and may be stored in a database of vehicle images (e.g. accessible to processor(s) or an ADS on ego vehicle 102. VRAI may include information to facilitate detection and classification of vehicles. VRAI may include sample images of different types of vehicles from various viewpoints. In some embodiments, VRAI may include sample vehicle images of various sizes to facilitate detection and/or classification or the sample vehicle images may be resizeable to facilitate image comparison.

In some embodiments, VRAI may be based on vehicles likely to be encountered based on one or more (a) a current location of ego vehicle 102; (b) a planned route (e.g. using a navigation system) for ego vehicle 102; (c) a location history (e.g. over some prior time period, and/or based on frequency of visits). The vehicles likely to be encountered may be based on aggregate vehicle sales and/or aggregate active vehicle registration information for a location (e.g. as provided by vehicle vendors, a data aggregator, or other publicly available databases). In some embodiments, a processor may cache images of popular vehicles for a locale and/or images of vehicles that have been repeatedly classified during some preceding time period. In some embodiments, the database of second images of vehicles may be updated based on the current location of ego vehicle 102. In some embodiments, based on a planned route to a destination, images of likely target vehicles may be downloaded and cached prior to or at the start of a trip. In some embodiments, stored images may be tagged (e.g. with a locale) to facilitate matching with captured images based on a current location of ego vehicle 102. In one embodiment, VRAI may classify a vehicle based on one or more of: vehicle type, vehicle model, model year etc., but, depending on the viewpoint and/or images obtain, may discontinue classification (e.g. at vehicle type without determining a model) and/or discontinue unique identification (e.g. determine make and model but discontinue unique identification to determine if the target vehicle had been seen earlier).

Referring to FIG. 3A, in some embodiments, VRAI may be provided to ego vehicle 102 over V2X (e.g. V2N and/or V2I) and/or an entity or cloud based service over network 120 and/or IP layer 126. As another example, in some embodiments, the one or more first images may be sent by ego vehicle 102 (e.g. over V2X) to an entity coupled to network 120 and/or IP layer 126. In some embodiments, a cloud service, AS 110, AS 130, and/or another entity coupled to network 120 and/or IP layer 126 may detect and/or classify at least one target vehicle in the one or more first images and transmit detection and/or classification related information corresponding to the at least one target vehicle to ego vehicle 102. In some embodiments, VRAI may comprise vehicle detection and/or classification related information. In some embodiments, target vehicles 104-7 and/or 104-8 may store images of themselves and send the images to ego vehicle 102 over a V2V connection (e.g. V2V connections 105-3 and 105-4, respectively). The received images may be stored and/or used (e.g. by ego vehicle 102) to detect and/or classify the corresponding target vehicles. Referring to FIG. 2A, in block 210, in some embodiments, ego vehicle 102 may determine a classification of at least one target vehicle based on the one or more first images using the received VRAI.

In block 270, one or more vehicle characteristics corresponding to the least one target vehicle may be obtained based on the classification of the least one target vehicle. In some embodiments, a vehicle database may store information about vehicle characteristics indexed by vehicle classification. In some embodiments, the vehicle characteristics may be based on make and model information. The term vehicle characteristic for a vehicle, as used herein, includes one or more of: a corresponding vehicle form factor, a 3D vehicle model, vehicle representations, vehicle attributes (physical, structural, etc.), vehicle dimensional information such as maximum length, maximum width, maximum height, typical wheel size, distance between headlights, wheelbase, taillight distance, rear bumper light distance, rear axle track distance (distance between rear wheels), etc. In some embodiments, vehicle characteristic information may include a vehicle color or logo, for example, when colors or logos are distinct to particular makes and/or models of vehicles. The vehicle dimensional parameters, may be a number (e.g. Q meters), or a range (between Q and R meters) and may include statistical parameters (e.g. a standard deviation, confidence interval, etc.) associated with the estimates. In some embodiments, vehicle characteristics may include a form factor for the vehicle. In some embodiments, the dimensional parameters may be adjusted based on the uncertainty associated with the classification. For example, target vehicle dimensions may be increased (e.g. to provide a greater margin of safety when maintaining some distance from the target vehicle). In some instances, for example, where make and model information is unavailable, generic information based on vehicle type may be used. For example, vehicular dimensions or a vehicular dimensional range may be used based on the vehicle type (e.g. depending on whether the vehicle has been classified as a bicycle, scooter, motorcycle, car, van, sports-utility vehicle (SUV), truck, etc.)

Figure 2F:
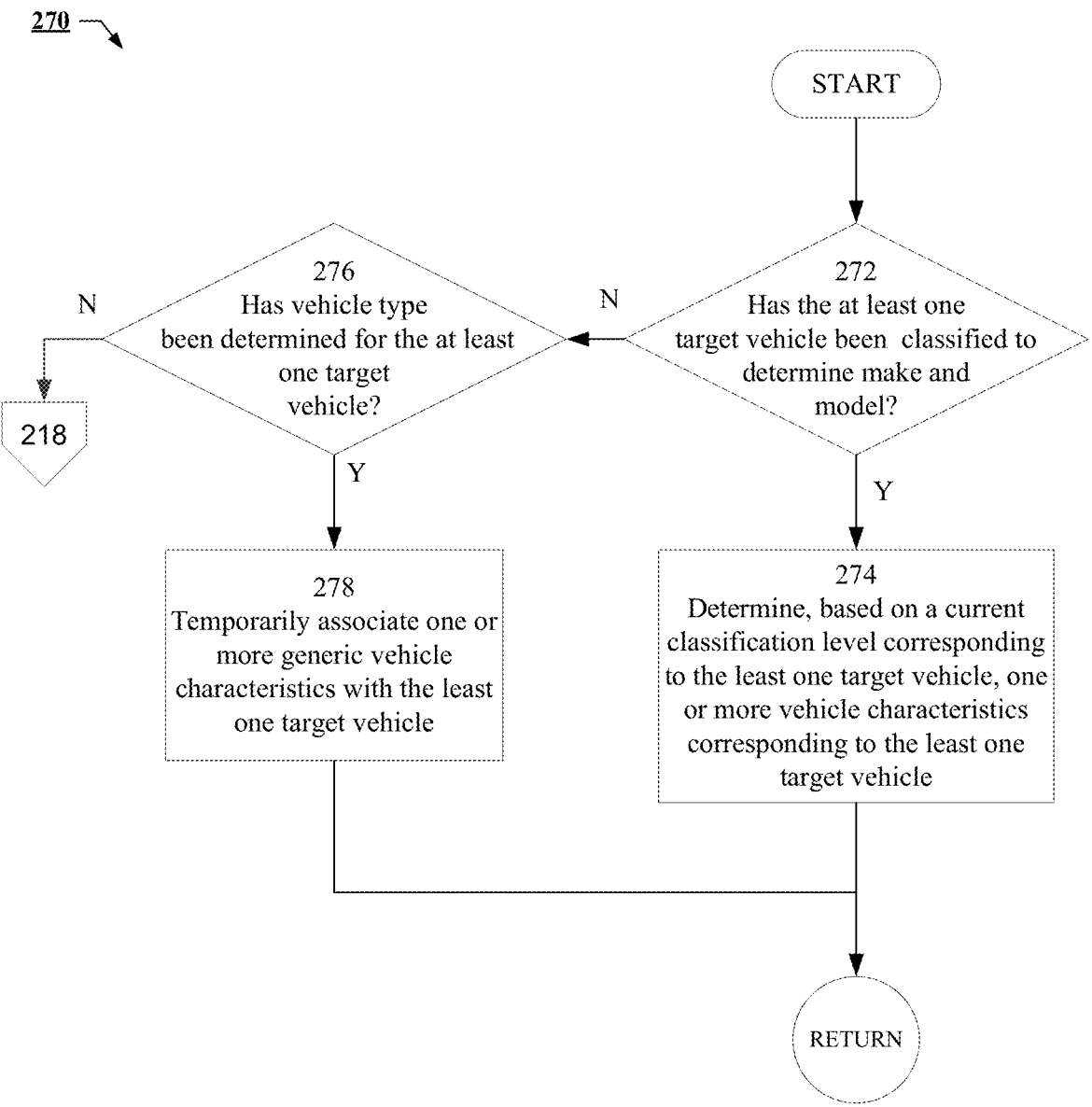

FIG. 2F shows a flowchart associated with exemplary block 270. Upon invocation of subroutine 270, in block 272, if the at least one target vehicle has been classified to determine make and model ("Y" in block 272), then, in block 274, based on a current classification level corresponding to the least one target vehicle, one or more vehicle characteristics corresponding to the least one target vehicle may be determined. For example, a form factor or 3D model (e.g. 3D model 370) associated with the at least one target vehicle may be determined. In some embodiments, when a corresponding target vehicle model year and/or corresponding target vehicle trim is available, corresponding target vehicle characteristics may be determined based on the determined vehicle make and vehicle model (including vehicle model year and/or trim).

In block 272, if make/model classification for the at least one target vehicle is not available ("N" in block 272) then, in block 276, it may be determined if a corresponding target vehicle type (e.g. small car, van, etc.) for the at least one target vehicle is available. In block 276, if a vehicle type classification is unavailable ("N" in block 276), then block 218 may be invoked to process additional images.

In block 276, if a vehicle type is available ("Y" in block 276), then generic vehicle characteristics (e.g. a form factor) associated with the vehicle type (e.g. small car or van, etc.) may be associated with the at least one target vehicle and control may then return to the calling routine. Accordingly, where make and model information is unavailable, vehicle characteristics may be estimated based on the generic classification by analyzing corresponding target vehicle images. For example, input from sensors (e.g. image sensors, depth sensors, radar, etc.) may be used to estimate a distance to the target vehicle. Further, target vehicle characteristics such as vehicle dimensions or vehicle dimension ranges for at least one target vehicle may be determined based on: (a) dimensions of nearby classified target vehicles in the image and/or (b) known sizes of objects/features in the image (e.g. road signs, etc.). For example, a real world target vehicle width or a width range may be estimated by comparing a width of the target vehicle in the one or more first images (and available sensor input) with the sizes of known features in the image (e.g. road signs, other classified vehicles, etc.). The known sizes of one or more features in an image along with knowledge of image sensor parameters may be used to estimate target vehicle form factors, target vehicle dimensional information. In some embodiments, the generic form factor may be scaled based on any determined dimensional information.

Figure 3C:
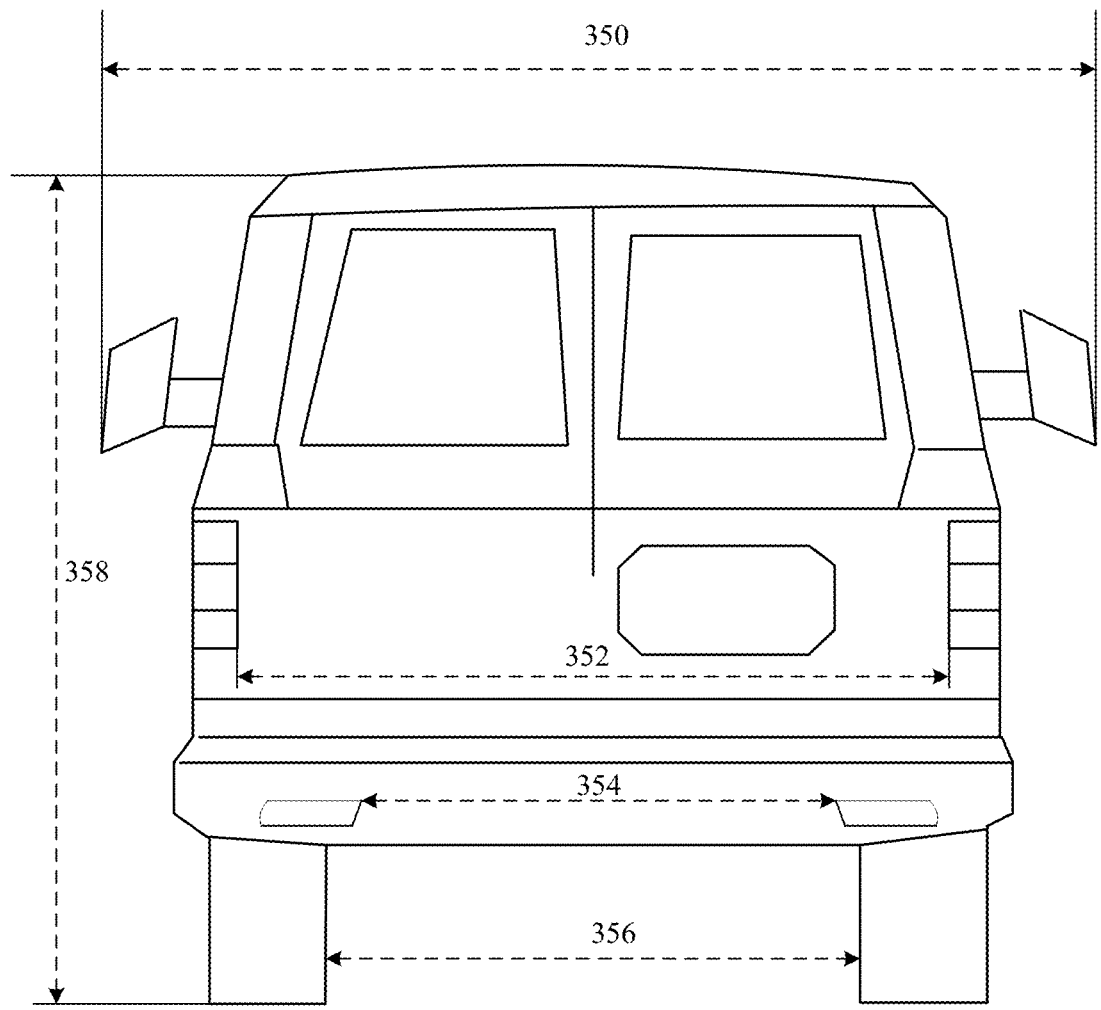
FIG. 3C shows some exemplary dimensions that may be determined from classification of a target vehicle.

FIG. 3C shows some exemplary dimensions that may be determined from classification of a target vehicle. The dimensional parameters shown in FIG. 3C are merely exemplary and various other dimensional parameters of target vehicle 104-8 may be determined based on the classification of target vehicle 104-8. For example, in block 270, vehicle characteristics for at least one target vehicle (e.g. 104-8) may be obtained. The vehicle characteristics may include one or more of: taillight distance 352, rear bumper light distance 354, rear axle track (distance between rear wheels) distance 356, maximum height 358, and/or maximum width 350. In some embodiments, vehicle characteristics for a target vehicle (e.g. obtained in block 270) may include a 3D model and/or other attributes of the corresponding target vehicle. In some embodiments (e.g. in jurisdictions where the use of unique vehicle characteristics is consistent with local privacy and other applicable laws), vehicle characteristics for classification (and/or unique identification) may include characteristics unique to a target vehicle, such as license plate information, logos, bumper stickers, dents, etc. In some embodiments, vehicle characteristics unique to a target vehicle may be used temporarily (e.g. so long as the target vehicle is proximate to ego vehicle 102) to classify (and/or uniquely identify) the target vehicle.

Figure 3D:
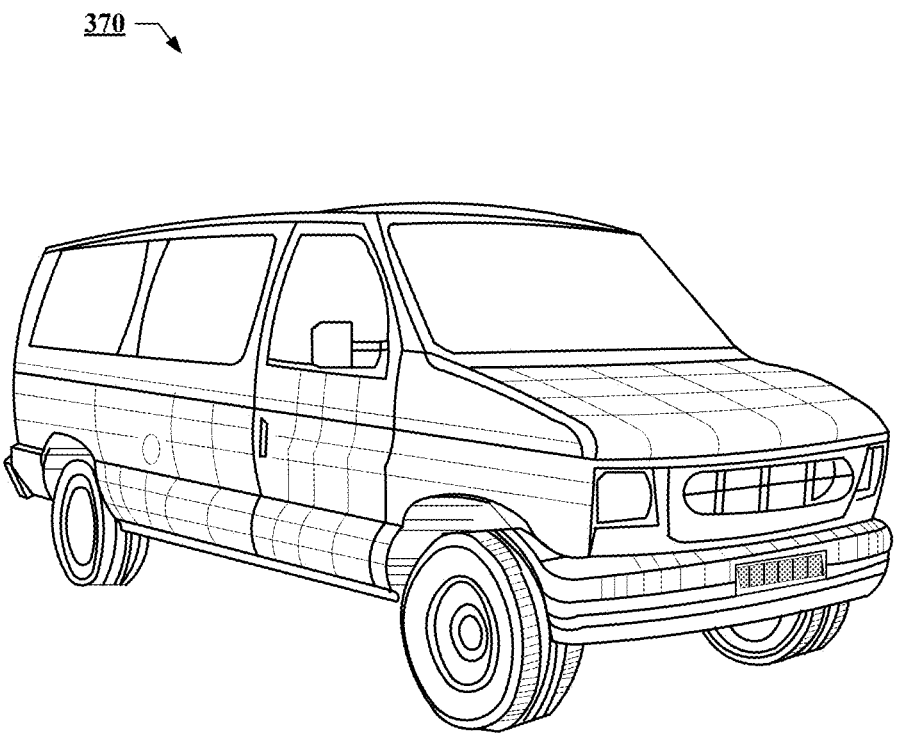
FIG. 3D shows an example 3-Dimensional (3D) model of a target vehicle.

FIG. 3D shows an example 3D model 370 of target vehicle 104-8. In some embodiments, 3D model 370 may be obtained from a vehicle model database and/or a V2X entity based on the classification of target vehicle 104-8. In some embodiments, 3D model 370 may form part of vehicle characteristic information (e.g. obtained in block 270) for target vehicle 104-8 and may include corresponding vehicle dimensional information, form factor information, etc. for target vehicle 104-8. The term three-dimensional (3D) model may refer to one: 3D geometric models, and/or 3D surface-edge-vertex models, and/or 3D mesh models, and/or 3D relational models, and/or 3D wireframe models, etc. The 3D model of a vehicle may also include various dimensions (maximum length, maximum width, maximum height etc.), dimensional ratios, wheelbase, wheel height, etc.). For example, a 3D mesh model may describe an object (e.g. a target vehicle) by a set of vertices and edges that form polygons (e.g. triangles) in 3D space. A 3D wireframe model may include the edges and vertices of an object (e.g. a target vehicle). A surface-edge-vertex representation may include vertices of the object, surfaces of the object, edge segments of the object, and topological relationships that specify: (a) surfaces that share an edge; and (b) edges that share a vertex. 3D relational models may include 3D primitives (e.g. volumes, surface patches, line/curve features, etc.) and associated 3D spatial relationships.

Referring to FIG. 2A, in some embodiments, in block 280, position information corresponding to the at least one target vehicle relative to the ego vehicle may be determined based on the one or more vehicle characteristics. The position information may include one or more of: a range of a target vehicle 104 (e.g. a current distance of the target vehicle 104 from the ego vehicle 102); and/or an orientation of the target vehicle 104 relative to the ego vehicle 102. In some embodiments, the position information may include a pose of the target vehicle relative to the ego vehicle.

In some embodiments, based on the known target vehicle characteristic information (e.g. vehicular dimensional information for the target vehicle), position information for target vehicle may be determined based on corresponding visible features of the target vehicle in the one or more first images. For example, triangulation techniques may be used to determine target vehicle position and/or orientation relative to the ego vehicle. When target vehicle characteristic information includes 3D model information for the target vehicle, position information for the target vehicle may be determined based on information obtained from the 3D model and comparing the obtained information to corresponding visible features in the first images of the target vehicle. In some embodiments, input from sensors (e.g. radar) and/or sensor parameters (e.g. focal length, camera orientation, and/or available depth information) may also be used to determine target vehicle position information. Target vehicle position information may include position and orientation information pertaining to the target vehicle. In some embodiments, symmetric target vehicle attributes may be used to enhance target vehicle pose determination. For example, symmetric features may be sized differently or have different form factors in an image based on their relative position/distance from the ego vehicle image sensor(s), such attributes may facilitate or enhance target vehicle pose determination.

In some embodiments, upon classification, a vehicle characteristic (e.g. form factor based on the classification) may be associated with the at least one target vehicle based on the determined target vehicle pose. In some embodiments, target vehicle attributes categorized as symmetric or categorized as useful for form factor association, or categorized as permanent may be used to attach the form factor or other vehicle characteristic based on the target vehicle pose. In some embodiments, following target vehicle classification and localization, the at least one target vehicle may be tracked while it remains pertinent. In some embodiments, any visible portion of the at least one target vehicle that is being tracked may be used to attach a form factor. For example, even if only the wheel rims are seen underneath a tractor-trailer or parts of a vehicle are seen through a window, those visible portions may be used to attach a form factor based on the determined pose of the target vehicle.

As another example, to determine pose, triangulation may be used. For example, one or more of the known distance between tail lights, vehicle width, etc. (target vehicle characteristics) of the target vehicle (e.g. obtained based on classification of the target vehicle) may be compared with corresponding visible features in the first images of the target vehicle to determine a location of the target vehicle. As another example, when target vehicle license plates are visible and vehicle license parameters (e.g. vehicle license plate size and/or vehicle license plate character size) are of known size, position information of the corresponding target vehicle may be determined by comparing the size and orientation of the target vehicle license plate/characters in the first images with known vehicle license plate parameters. The license plate parameters may be determined based on a current location of ego vehicle 102, and/or based on registration information (e.g. state or jurisdiction markings) on the vehicle license plate. The location determination of the target vehicle may further be based on the orientation of the camera at the time the image was captured, lens parameters, input from sensors such as radar, available depth information (e.g. from an RGBD camera, lidar, etc.).

In some embodiments, a display on ego vehicle may be updated based on the determined pose (location and orientation information of the target vehicle) and vehicle characteristics. For example, once a target vehicle 104-8 has been classified and its pose relative to ego vehicle 102 has been determined, 3D model 370 or a form factor may be associated with or attached to any visible portion of target vehicle 104-8 and displayed. The form factor may be oriented to reflect the orientation of the target vehicle. Thus, drivers and/or occupants may be able to view a direction of travel of the target vehicle along with the form factor. The orientation information may help a driver determine whether a target vehicle is changing lanes, taking an exit ramp, etc. The display may be updated while target vehicle 104-8 remains pertinent and continues to be tracked. In some embodiments, information pertaining to target vehicle behavioral characteristics (e.g. velocity and/or acceleration) may be associated with the displayed target vehicle representation.

In some embodiments, a 3D bounding box may be applied to a target vehicle 104 imaged by ego vehicle 102, once that vehicle has been classified and/or identified. In some embodiments, the 3D bounding box for a target vehicle 104 may be based on target vehicle characteristics (e.g. 3D model, vehicle dimensions, form factor, etc.). In some embodiments, the 3D bounding box may be used to augment or enhance a prior 2D bounding box (e.g. 2D bounding box of an image of target vehicle 104-7 or 2D bounding box of an image of target vehicle 104-8, as shown in FIG. 3A). In some embodiments, following classification and/or identification, a 2D bounding box associated with a target vehicle 104 may be augmented or replaced with a 3D bounding box. In some embodiments, ego vehicle 102 may use information obtained from V2X and/or from various sensors including radar, ultrasound, etc. to determine the 3D bounding box for a target vehicle 104.

In some embodiments, following classification, a form factor or other representation may be associated with any visible portion of the target vehicle based on the determined target vehicle pose. As one example, the form factor corresponding to a target vehicle may be associated with the target vehicle pose even when the target vehicle is partially obscured by another vehicle. In some embodiments, information based on target vehicle characteristics (e.g. the form factor, 3D model or other information) may be displayed at a screen location corresponding to the target vehicle position and in an orientation corresponding to the target vehicle orientation even when the target vehicle is partially occluded. For example, when the vehicle is being tracked (e.g. after classification and/or location determination), a form factor or 3D model 370 may be attached to target vehicle 104-9 even if only a portion of target vehicle 104-8 (e.g. logo) is visible. As one example, a motorcycle towing a trailer may be classified as make X model Y (e.g. by ego vehicle 102) at a time t1. The motorcycle may temporarily be obscured by another vehicle such as a large truck. At a subsequent time, t2, when the motorcycle begins to emerge from behind the large truck, an image of a front wheel may be obtained (e.g. by ego vehicle 102) and may be determined to correspond to a make X model Y motorcycle (e.g.). In some embodiments, the form factor associated with the make X model Y motorcycle towing the trailer may be displayed based on the relative pose (e.g. determined based on the front wheel) even though the rest of the motorcycle and the towed trailer (other than the front wheel) are not yet visible at time t2.

As another example, for the motorcycle (target vehicle) above (classified as make X model Y), a pose of the motorcycle may be determined and a form factor may be associated with the motorcycle based on the determined pose. In some embodiments, the motorcycle (target vehicle) may be tracked without further classification/re-classification while it remains partially visible. In some instances, portions of the motorcycle may be obscured (e.g. by a large truck) for some time period but other portions of the motorcycle may remain in view. During the period when the motorcycle (target vehicle) is partially obscured, the motorcycle (target vehicle) may continue to be tracked and localized (e.g. its pose relative to ego vehicle 102 may be determined) and the entire form factor or 3D model of the motorcycle may be attached to visible portions of the motorcycle based on the relative pose of the motorcycle.

Accordingly, in some embodiments, the one or more first images of one or more target vehicles may comprise a partially occluded target vehicle (e.g. in block 205) and classifying at least one target vehicle (e.g. in block 210) may comprise classifying the partially occluded target vehicle based on a visible portion of the partially occluded target vehicle in the one or more first images. In some embodiments, vehicle characteristics associated with the partially occluded target vehicle may be determined and/or may previously have been determined (e.g. in block 270) based on the classification, and a pose for the partially occluded target vehicle may be determined (e.g. in block 280) based on vehicle characteristics associated with the visible portion of partially occluded target vehicle. In some embodiments, a form factor or other representation of the entire target vehicle may be associated with the visible portion of the partially occluded target vehicle based on the target vehicle position information. Thus, a driver or other occupant and/or an ADS may have information about a target vehicle even when the target vehicle is partially occluded. In some embodiments, following block 280, control may be returned to a calling routine and/or another iteration may be commenced.

In conventional systems, the monitoring and/or tracking of target vehicles may fail when the target vehicle is partially occluded, in part, because of the inability of conventional ADS to detect the partially occluded vehicle. In addition, even in instances where the partially occluded vehicle may be detected, conventional ADS is unable to determine: (a) the pose of the partially occluded vehicle relative to the ego vehicle; and/or (b) a classification or form factor associated with the partially occluded target vehicle, thereby limiting the utility of the detection. In some disclosed embodiments, a driver/occupant of the ego vehicle may continue to maintain traffic and target vehicle awareness and can be alerted to one or more of: target vehicle classification, target vehicle dimensions, target vehicle position, target vehicle direction of travel, target vehicle velocity, target vehicle acceleration, and other target vehicle characteristics. In addition, the traffic/target vehicle awareness may be maintained even in situations when the tracked target vehicle is partially obscured.

FIGS. 4A-4C show some example displays associated with conventional radar and lidar based systems. FIG. 4A shows a conventional radar plot 400, where target vehicles are shown as blobs 405, 410, and 415 based on their locations relative to an ego vehicle 102. FIG. 4B shows a conventional annotated radar plot 420, where the blobs representing target vehicles in radar plot 400 (of FIG. 4A) have been segmented replaced by more easily viewable icons 425, 430, and 435 (corresponding to blobs 405, 410, and 415, respectively, in FIG. 4A). In addition, conventional annotated radar plot 420 may also include annotations 440 to indicate lane markings. FIG. 4C shows a conventional lidar plot 450 with section 453 indicating blobs 455, 465, and 460 for target vehicles (and corresponding to blobs 405, 410, and 415, respectively, in FIG. 4A). Lidar plot 450 includes a separate section 470 indicating of the ranges of the target vehicles 455 (shown as "car 455" in section 470), 460 (shown as "car 460" in section 470), and 465 (shown as "car 465" in section 470) that are displayed in section 453. Thus, in conventional radar or lidar based systems, an ADS system may have very limited information about target vehicles in proximity to the ego vehicle thereby impacting ADS decision making.

Figure 5:
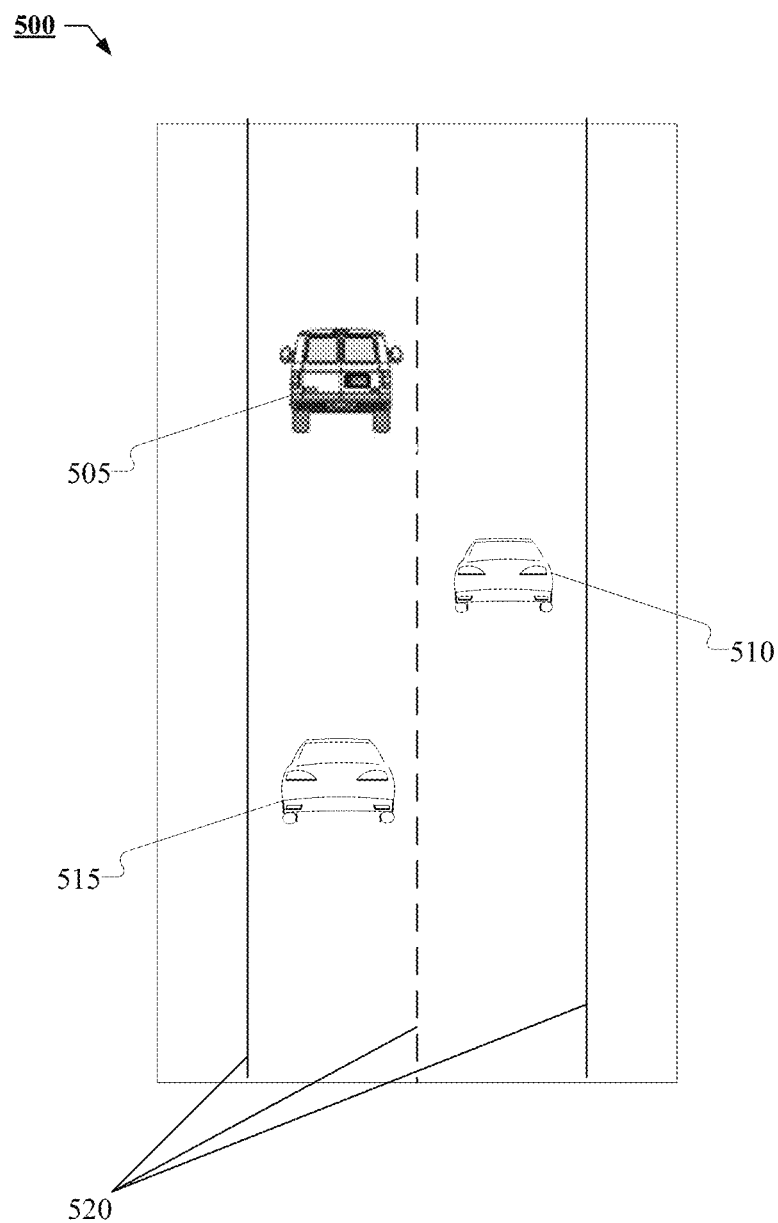
FIG. 5 shows an example display depicting a representation of target vehicles 104 according to some disclosed embodiments.

FIG. 5 shows an example display 500 depicting a representation of target vehicles 104 according to some disclosed embodiments. The representations of target vehicles 104 shown in display 500 are merely an example and various other representations may be used. For example, representations of target vehicles 104 may be placed into one or more of: a projection of the environment around ego vehicle 102, a map (including a 3D map and/or a bird's eye view map) of an area around ego vehicle 102, superimposed over a real world image, for example, by using Augmented Reality (AR), etc. The type of representation may depend on the capabilities of ego vehicle 102 (including capabilities of components and/or mobile devices located in ego vehicle 102).

As shown in FIG. 5, target vehicles may be displayed using representations (e.g. 505, 510, and 515), wherein each representation may be based on a corresponding vehicle characteristic (e.g. 3D model, form factor, stored images, etc. obtained in block 270). In some embodiments, the representations may be based on the relative pose of the corresponding target vehicle. Accordingly, the representation for a target vehicle may show one of a front view, rear view, right side view, left side view, a top view, or a projective view based on the corresponding 3D model and the relative pose of the target vehicle. In some embodiments, a form factor or a depiction based on the 3D model and the relative pose of the target vehicle may be used. In some embodiments, the vehicle characteristic (e.g. obtained in block 270) based representation may be used even when only a portion of the target vehicle is viewable. For example, when a tracked target vehicle 104 is obscured by another vehicle (or some other obstruction), the vehicle characteristic based representation (e.g. form factor) of the tracked target vehicle may be appropriately overlaid over any visible portion of the tracked target vehicle 104. Thus, the driver, other vehicle occupants, and/or an ADS system for ego vehicle 102 may continue to maintain and include information about target vehicles that are partially visible thereby facilitate decision making. In some embodiments, the use and availability of vehicle characteristics (e.g. 3D model of a target vehicle) may facilitate ADS decision making. For example, target vehicle size and other information available in a 3D model may facilitate decision making in relation to steering, collision avoidance, navigation, braking, lane changes, and ensuring that safety margins are maintained.

Figure 6:
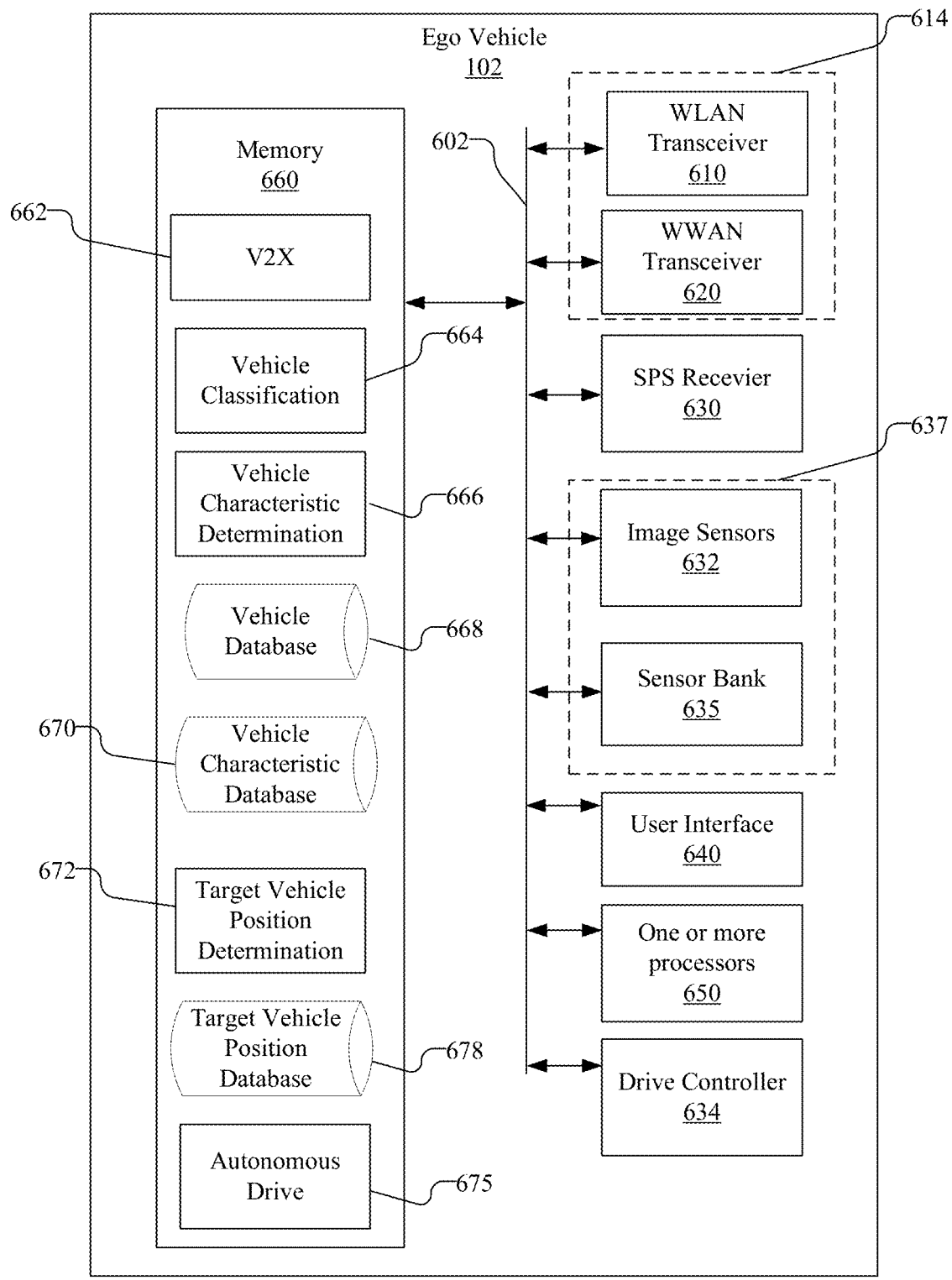
FIG. 6 is a diagram illustrating an example of a hardware implementation of an ego vehicle capable of V2X communications with V2X entities and engaging in autonomous or partially autonomous driving.

FIG. 6 is a diagram illustrating an example of a hardware implementation of an ego vehicle 102 capable of V2X communications with V2X entities and engaging in autonomous or partially autonomous driving as discussed herein. The ego vehicle 102, for example, may include transceivers 614, which may comprise a Wireless Local Area Network (WLAN) transceiver 610 and a Wireless Wide Area Network (WWAN) transceiver 620. Wireless Wide Area Network (WWAN) transceiver 620 may include a transmitter and receiver, such as a cellular transceiver, configured to communicate wirelessly with AS 110 and/or AS 130 and/or cloud services via base stations (e.g. RSU 122 and/or BS 124) in wireless network 120. As outlined above, AS 110 and/or AS 130 and/or cloud services may provide ADS related information, including ADS assistance information, which may facilitate ADS decision making ADS assistance information may include VRAI. VRAI may include information pertinent to vehicle classification, vehicle characteristic information (e.g. dimensional information, distinguishing features, 3D vehicle models, and/or other attributes related to a vehicle), which may facilitate one or more of: target vehicle detection, target vehicle classification, target vehicle unique identification, and/or target vehicle localization. WWAN transceiver 620 may also be configured to wirelessly communicate directly with other V2X entities, such as target vehicles 104, e.g., using wireless communications under IEEE 802.11p on the ITS band of 5.9 GHz or other appropriate short range wireless communications. Ego vehicle 102 may further include a Wireless Local Area Network (WLAN) transceiver 610, including a transmitter and receiver, which may be used for direct wireless communication with other entities, and in some embodiments with V2X entities, such as other servers, access points, and/or target vehicles 104.

Ego vehicle 102 may further include SPS receiver 630 with which SPS signals from SPS satellites 180 may be received. Satellite Positioning System (SPS) receiver 630 may be enabled to receive signals associated with one or more SPS/GNSS resources such as SVs 180. Received SPS/GNSS signals may be stored in memory 660 and/or used by one or more processors 650 to determine a position of ego vehicle 102. Processor(s) 650 may include one or more of Central Processing Units (CPUs), Digital Signal Processors (DSPs), Neural Processing Units (NPUs), Vision Processing Units (VPUs), image processors, microcontrollers, ASICs, and/or dedicated hardware as described herein. As one example, a dedicated inference ASIC or a dedicated inference accelerator ASIC may be used to process AI inference workloads to detect, classify, and/or identify vehicles.

In some embodiments, SPS receiver 630 may include a code phase receiver and a carrier phase receiver, which may measure carrier wave related information. The carrier wave, which typically has a much higher frequency than the pseudo random noise (PRN) (code phase) sequence that it carries, may facilitate more accurate position determination. The term "code phase measurements" refer to measurements using a Coarse Acquisition (C/A) code receiver, which uses the information contained in the PRN sequence to calculate the position of ego vehicle 102. The term "carrier phase measurements" refer to measurements using a carrier phase receiver, which uses the carrier signal to calculate positions. The carrier signal may take the form, for example for GPS, of the signal L1 at 1575.42 MHz (which carries both a status message and a pseudo-random code for timing) and the L2 signal at 1227.60 MHz (which carries a more precise military pseudo-random code). In some embodiments, carrier phase measurements may be used to determine position in conjunction with code phase measurements and differential techniques, when GNSS signals that meet quality parameters are available. The use of carrier phase measurements along with differential correction can yield relative sub-decimeter position accuracy.

Ego vehicle 102 may further include sensors 637, which may comprise image sensors 632 and sensor bank 635. In some embodiments, information from sensor bank 635 may be used during processing of image obtained by image sensors 632. For example, information from radar (which may form part of sensor bank 635) may be used for target vehicle localization. Image sensors 632 may include one or more cameras, CCD image sensors, or CMOS image sensors, computer vision devices, lidar, etc., or a combination of the above, mounted at various locations on ego vehicle 102 (e.g. front, rear, sides, top, corners, in the interior, etc.). Image sensors 632 may be used to obtain images of one or more target vehicles 104 that are proximate to ego vehicle 102. In some embodiments, mage sensors may include depth sensors, which may be used to estimate range to a target vehicle and/or estimate vehicular dimensions. The term depth sensor is used broadly to refer to functional units that may be used to obtain depth information including: (a) RGBD cameras, which may capture per-pixel depth information when the depth sensor is enabled; (b) stereo sensors such as a combination of an infra-red structured light projector and an infra-red camera registered to a RGB camera; (c) stereoscopic cameras capable of capturing 3D images using two or more cameras to obtain depth information for a scene; (d) lidar sensors; etc. In some embodiments, image sensor(s) 632 may continuously scan the roadway and provide images to the one or more processors 650 along with information about corresponding image sensor pose and other parameters. In some embodiments, the one or more processor(s) 650 may trigger the capture of one or more images of target vehicles 104 using commands over bus 602.

Sensor bank 635 may include various sensors such as one or more of: ultrasonic sensors, ambient light sensors, radar, lidar, etc., which may be used for ADS assistance and autonomous or partially autonomous driving. Ego vehicle 102 may also include drive controller 634 that is used to control ego vehicle 102 for autonomous or partially autonomous driving e.g., based on the data from image sensors 632 and/or sensor bank 635. Ego vehicle 102 may include additional features, such as user interface 640 that may include e.g., a display, a keypad or other input device, such as a voice recognition/synthesis engine or virtual keypad on the display, through which the user may interact with the ego vehicle 102 and/or an ADS associated with ego vehicle 102.

Ego vehicle 102 may further include one or more processors 650 and memory 660, which may be coupled to each other and to other functional units on ego vehicle 102 using bus 602. In some embodiments, a separate bus, or other circuitry may be used to connect the functional units (directly or indirectly). Memory 660 may contain executable code or software instructions that when executed by the one or more processors 650 cause the one or more processors 650 to operate as a special purpose computer programmed to perform the techniques disclosed herein.

For example, memory 660 may include vehicle classification unit (VCL) 664 that causes the one or more processors 650 to determine a vehicle classification (e.g. make, model, body style, vehicle type etc.) of a target vehicle 104 based on one or more images from image sensors 632 and the corresponding pose(s) of image sensor(s) 632 at the time of image capture. For example, VCL 664 may include instructions to configure the one or more processors 650 to implement functionality associated with block 210. In some embodiments, VCL 664 may include instructions to detect and classify target vehicles in captured images by matching the captured images with one or more second images of vehicles, (e.g. stored in a vehicle database (VDB) 668) based on the image sensor pose at the time of capture of the first images. For example, vehicles may be detected in images using various salient features such as edges and symmetry. Vehicles may also be detected based on motion blur. In some embodiments, optical flow techniques may be used. In some embodiments, input from sensors (e.g. radar), may also be used to detect vehicles. In some embodiments, image sensor parameters (e.g. focal length and other lens parameters), corresponding image sensor pose(s), and/or other sensory input (e.g. radar) may be used during the detection and classification of target vehicles 104 based on the captured images.

In some embodiments, memory 660 may include vehicle database (VDB). In some embodiments, VDB may correspond to and/or include vehicle database 330 (FIG. 3B). Each of the second images stored in VDB 668 may be associated with a vehicle classification. Vehicle images in VDB 668 may include images of various vehicles be taken at various poses (e.g. as shown in FIG. 3B). In some embodiments, a generic model may be used where vehicle classification is difficult (e.g. for a stroller, bicycle, personal transporter, etc.). In some embodiments, images of vehicles stored in VDB 668 may be: based on vehicle popularity (e.g. vehicle sales or vehicle ownership data) in an area, which may be based on a current location of ego vehicle 102, or based on likelihood of interaction along a planned route. In some embodiments, vehicle images that may be obtained from target vehicles 104, AS 110, and/or AS 130 and/or cloud services may be used to update and/or augment VDB 668. In some embodiments, AS 110 and/or AS 130 and/or cloud services associated with network 120 may provide historical data or real-time data about a current environment (e.g. crowdsourced and/or road sensor based and/or from roadway cameras/image sensors) around ego vehicle 102 or related to a planned route of ego vehicle 102, which may be preloaded into VDB 668. In some embodiments, the vehicle images in VBD 668 may be associated with fields for vehicle attributes and/or vehicle characteristics (e.g. dimensions, form factor, 3D model, etc.).

In some embodiments, VCL 664 may cause the one or more processors 650 to perform vehicle classification by determining one or more second images in VDB 668 that match a first image (e.g. using image matching/recognition techniques) based on the image sensor pose at the time of capture. The target vehicle may be classified based on the vehicle classification associated with a matching image (e.g. in VDB 668). In some embodiments, the one or more processors 650 implementing VCL 664 may warp the captured images of target vehicle 104 based on the image sensor pose at the time of capture and compare the warped images of target vehicle 104 to images of vehicles stored in VDB 668 (or stored images in VDB 668 may be warped based on the image sensor pose and compared to captured images). A vehicle classification may be determined based on the degree to which the warped images of target vehicle 104 (or features in the warped image of a target vehicle 104) match images (or corresponding features) of a vehicle (make and model) stored in VDB 668 (or vice versa).

In some embodiments, memory 660 may include Vehicle Characteristic Determination (VCD) 666 with program code that causes the one or more processors 650 to determine vehicle characteristics based on the vehicle classification (e.g. determined by the one or more processors 650 implementing VCL 664). In some embodiments, VCD 666 may include code to implement functionality associated with block 270. The vehicle characteristics may be stored in vehicle characteristic database (VCH-DB) 670 and indexed by vehicle classification. As outlined above, vehicle characteristics may include, for example, one or more of: (a) physical attributes such as dimensional information related to the vehicle classification (e.g. vehicle height, tail light distance, etc.); and/or (b) a form factor associated with the vehicle classification; and/or (c) various other vehicle attributes, and/or (d) a 3D model associated with the vehicle classification. The dimensional information may be a number, a range, dimensional ratios, and may include associated statistical information such as standard deviation, variance, etc. Vehicle characteristic information may be stored for popular vehicles, which may be: based on vehicle sales or vehicle ownership data in an area, based on a current location of ego vehicle 102, or based on likelihood of interaction along a planned route. In some embodiments, VCH-DB 670 may include 3D geometric models, and/or 3D surface-edge-vertex models, and/or 3D mesh models, and/or 3D relational models, and/or 3D wireframe models, etc. The 3D model of a vehicle may also include various dimensions (maximum length, maximum width, maximum height etc.), dimensional ratios, wheelbase, wheel height, etc.). In some embodiments, the one or more processors 650 may render images of vehicles based on target vehicle pose (e.g. for VDB 668 and/or target vehicle classification purposes) based on 3D model or vehicle characteristic information stored in VCH-DB 670. In some embodiments, vehicle characteristic information that may be obtained from target vehicles 104, AS 110, and/or AS 130 and/or cloud services may be used to update and/or augment VCH-DB 670.based on the vehicle classification.

In some embodiments, ego vehicle 102 may receive transmissions from another vehicle (e.g. target vehicle 104) directly (e.g. via V2V or WLAN) or indirectly (e.g. through another V2X entity). Ego vehicle 102 may receive the transmissions passively. For example, a target vehicle 104 may broadcast images of itself, information pertaining to its vehicle classification, and/or vehicle characteristics, which may be passively received by ego vehicle 102. Communication between ego vehicle 102 and another vehicle (e.g. a target vehicle 104) may also occur actively (e.g. following negotiation and establishment of two-way communication between ego vehicle 102 and the target vehicle 104). In some embodiments, a target vehicle 104 may also broadcast one or more of: (a) a current location of target vehicle 104 (b) other information (e.g. position, speed, acceleration, braking status, license plate information, number of passengers, vehicle usage information, destination, etc.). In some embodiments, VCL 664 may cause the one or more processors 650 to add or augment information in VDB 668 or VCH-DB 670 with the received images, parameters, and/or vehicle characteristics.

In some embodiments, memory 660 may include target position determination unit (TPD) 672 that causes the one or more processors 650 to determine position information related to at least one target vehicle 104 based on vehicle characteristic information. In some embodiments, TPD 672 may include program code to implement functionality associated with block 280. For example, target vehicle characteristics (e.g. vehicle related dimensions, other attributes, etc. from block 210 and/or from running VCD 666) and image sensor pose may be used to determine position information related to target vehicle 104. For example, the one or more processors 650 implementing TPD 672 may use triangulation based on dimensional parameters in target vehicle characteristics (e.g. vehicle width, distance between taillights, etc.) that are visible in the captured images (e.g. captured by image sensor 632), to determine position information for the corresponding target vehicle 104. The position information may include one or more of: range, target vehicle pose (e.g. position and orientation) of the corresponding target vehicle 104 relative to ego vehicle 102. In embodiments where an absolute pose of target vehicle 104 relative to a frame of reference is available, a relative pose of the target vehicle 104 (e.g. relative to ego vehicle 102) may be determined (e.g. using functionality associated with TPD 672) based on the known absolute pose of ego vehicle 102 in the frame of reference. Conversely, where a relative pose of target vehicle 104 (e.g. relative to ego vehicle 102) is available, an absolute pose of target vehicle 104 in the frame of reference may be determined (e.g. using functionality associated with TPD 672) based on the absolute pose of ego vehicle 102 in the frame of reference, In some embodiments, based on the position information, one or more target vehicles 104 may be displayed on a screen in ego vehicle 102. In some embodiments, the target vehicles may be displayed on the screen using an appropriate representation (e.g. a form factor, a vehicle image, 3D model, or as described in FIG. 5). In some embodiments, TPD 672 may also cause the one or more processors 650 to track the target vehicles and provide location updates. Location updates may also use input from other sensors in sensor bank 635. For example, the location of an icon or a representation of a 3D model associated with each target vehicle may be periodically updated on a display on ego vehicle 102 based on the relative pose of the corresponding target vehicle. Thus, the display on ego vehicle 102 may reflect real world conditions. The display updates may be useful in instances where driving conditions are challenging, visibility is impaired, or to provide decision confirmations (e.g. lane change OK) and alerts (vehicle in blind spot) to drivers or passengers.

In some embodiments, TPD 672 may also cause the one or more processors 650 to store a current location of one or more target vehicles in Target Vehicle Position database (TVP-DB) 678. TVP-DB 678 may hold current position information about one or more target vehicles such as a corresponding unique identifier for the target vehicle 104, corresponding relative or absolute pose of the target vehicle 104, a corresponding velocity (speed and direction), corresponding target vehicle behavioral attributes (accelerating/braking, etc.), a corresponding timestamp indicative of the time the target vehicle was last observed, etc. In some embodiments, TPD 672 may also cause the one or more processors 650 to update TVP-DB 678 when position information related to one or more target vehicles is determined to have changed. In some embodiments, information related to target vehicles that are currently under observation or that may have been observed within a first time period from the current time may be cached. In some embodiments, TPD 672 may also cause the one or more processors 650 to delete target vehicle information from TVP-DB 678 when a target vehicle in TVP-DB 678 has not been observed for some specified second time period from a current time. TVP-DB 678 may include links to information in VDB 668 and/or VCH-DB 670.

As illustrated in FIG. 6, the memory 660 may include program code, components, or modules that may be implemented by the one or more processors 650 to perform the methodologies described herein. While the code, components, or modules are illustrated, in FIG. 6, as software in memory 660 that is executable by the one or more processors 650, it should be understood that the code, components, or modules may be dedicated hardware either as part of the one or more processors 650 or implemented as physically separate hardware. In general, VCL 664, VCD 666, and Autonomous Drive (AD) 675 may be implemented using some combination of hardware, software, and/or firmware. For example, VCD 666 may be implemented using an image signal processor (ISP) and/or another dedicated hardware component.

Memory 660 may include V2X 662 with program code that when implemented by the one or more processors 650 configures the one or more processors 650 to cause the WWAN transceiver 620 or WLAN transceiver 610 to wirelessly communicate with V2X entities, RSU 122, BS 124, and/or target vehicles 104 and/or AS 110 and/or AS 130 and/or cloud services. V2X 662 may enable the one or more processors 650 to transmit and receive V2X messages to and from V2X entities, and/or target vehicles, and/or AS 110 and/or AS 130 and/or cloud services e.g., with payloads that include information, e.g., as used by one or more processors 650, VCL 664, VCD 666, TPD 672, and/or AD 675.

Memory 660 may include VCL 664 that may configure the one or more processors 650 to perform vehicle classification, and/or request ADS assistance (e.g. classification assistance) from AS 110 and/or AS 130 and/or cloud services and/or one or more target vehicles 104 via the WWAN transceiver 620 or WLAN transceiver 610. VCL 664 may cause the one or more processors 650 to request at least one of a vehicle classification, vehicle images, etc. from one or more AS 110 and/or AS 130 and/or cloud services (e.g. over V2X).

As illustrated, memory 660 may include additional executable autonomous driving (AD) code 675, which may include software instructions to enable autonomous driving and/or partial autonomous driving capabilities. For example, the one or more processors 650 implementing AD 675 may determine a current location of ego vehicle 102, current motion related parameters of ego vehicle 102, and position information of one or more target vehicles 104, motion related parameters of the one or more target vehicles 104. Based on one or more of the above parameters, the one or more processors 650 may control drive controller 634 of the ego vehicle 102 for autonomous or partially autonomous driving. Drive controller 634 may include some combination of hardware, software, and firmware, actuators, etc. to perform the actual driving and/or navigation functions.

The methodologies described herein may be implemented by various means depending upon the application. For example, these methodologies may be implemented in hardware, firmware, software, or any combination thereof. For a hardware implementation, the one or more processors 650 may be implemented within one or more ASICs (including dedicated inference ASICs and/or dedicated inference ASIC accelerators), CPUs, GPUs, NPUs, DSPs, VPUs, image processors, digital signal processing devices (DSPDs), programmable logic devices (PLDs), field programmable gate arrays (FPGAs), processors, controllers, micro-controllers, microprocessors, electronic devices, other electronic units designed to perform the functions described herein, or any combination thereof. In some embodiments, one or more processors 650 may include capability to detect and classify target vehicles in images (e.g. determine vehicle type), determine target vehicle characteristics (e.g. dimensions related to vehicular features such as headlight distance, taillight distance, bumper light distance, vehicle license plate sizes, etc.), and determine position information for one or more target vehicles. The one or more processors 650 may also include functionality to perform Optical Character Recognition (OCR) (e.g. on vehicle license plates), and perform other well-known computer vision and image processing functions such as feature extraction from images, image comparison, image matching etc.

For an implementation of ADS for an ego vehicle 102 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, program code may be stored in a memory (e.g. memory 660) and executed by the one or more processors 650, causing the one or more processors 650 to operate as a special purpose computer programmed to perform the techniques disclosed herein. Memory may be implemented within the one or more processors 650 or external to the one or more processors 650. As used herein, the term "memory" refers to any type of long term, short term, volatile, nonvolatile, or other memory and is not to be limited to any particular type of memory or number of memories, or type of media upon which memory is stored.

If ADS in ego vehicle 102 is implemented in firmware and/or software, the functions performed may be stored as one or more instructions or code on a computer-readable storage medium such as memory 660. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In some embodiments, instructions and/or data for ego vehicle 102 may be provided via transmissions using a communication apparatus. For example, a communication apparatus on ego vehicle 102 may include a transceiver, which receives transmission indicative of instructions and data. The instructions and data may then be stored on computer readable media, e.g., memory 660, and may cause the one or more processors 650 to be configured to operate as a special purpose computer programmed to perform the techniques disclosed herein. That is, the communication apparatus may receive transmissions with information to perform disclosed functions.

In some embodiments, ego vehicle 102 may include means for obtaining one or more images of one or more target vehicles. The means for obtaining one or more images may include image sensor means. Image sensor means may include image sensors 632 and/or the one or more processors 650 (which may trigger the capture of one or more images).

Ego vehicle 102 may include means for classifying target vehicles based on captured images, where the means for classifying may include the one or more processors 650 with dedicated hardware or implementing executable code or software instructions in memory 660 such as VCL 664 and/or VDB 668. In some instances, means for classifying target vehicles based on captured images may further include means for requesting and/or means for receiving assistance information, which may include WLAN transceiver 610 and/or WWAN transceiver 620, and/or the one or more processors 650 with dedicated hardware or implementing executable code or software instructions in memory 660 such as V2X 662. In some instances, means for classifying target vehicles based on captured images may further include means for determining a vehicle make and/or a vehicle model corresponding to one or more target vehicles, where the means for determining a vehicle make and/or a vehicle model may include the one or more processors 650 with dedicated hardware or implementing executable code or software instructions in memory 660 such as VCL 664 and/or VDB 668. In some embodiments, means for classifying target vehicles based on captured images may further include means for determining, for the one or more target vehicles, corresponding matching images of vehicles, each associated with a corresponding vehicle classification. Means for determining, for the one or more target vehicles, corresponding matching images of vehicles may comprise the one or more processors 650 with dedicated hardware or implementing executable code or software instructions in memory 660 such as VCL 664 and/or VDB 668.

Ego vehicle 102 may include means for obtaining one or more vehicle characteristics corresponding to one or more target vehicles based on the classification of the corresponding target vehicles, where the means for obtaining one or more vehicle characteristics may include the one or more processors 650 with dedicated hardware or implementing executable code or software instructions in memory 660 such as VCD 666 and/or VCH-DB 670.

Ego vehicle 102 may include means for determining the one or more position information of the at least one target vehicle relative to the subject vehicle based on the one or more vehicle characteristics, where the means for obtaining one or more vehicle characteristics may include the one or more processors 650 with dedicated hardware or implementing executable code or software instructions in memory 660 such as TPD 672 and/or TVP-DB 678.

Ego vehicle 102 may include means for displaying one or more corresponding representations of the at least one target vehicle, based, at least in part, on the one or more position information of the at least one target vehicle, where the means for displaying may include user interface 640, the one or more processors 650 with dedicated hardware or implementing executable code or software instructions in memory 660 such as TPD 672 and/or TVP-DB 678 and/or VDB 668 and/or VCH-DB 670.

Ego vehicle 102 may include means for means for sending an ADS related request to one or more application servers such as AS 110 and/or AS 130, and/or cloud services and/or one or more target vehicles 104 (e.g. over V2X). Means for sending an ADS related request may include WWAN transceiver 620 and/or WLAN transceiver 610, and/or the one or more processors 650, with dedicated hardware or implementing executable code or software instructions in memory 660 may be used to generate and send the ADS related request. The ADS related request may include vehicle classification assistance information (e.g. requests for vehicle images, requests for vehicle characteristics, etc.), requests for vehicle identification (e.g. based on information from vehicle license plates, vehicle characteristics, etc.).

Figure 7:
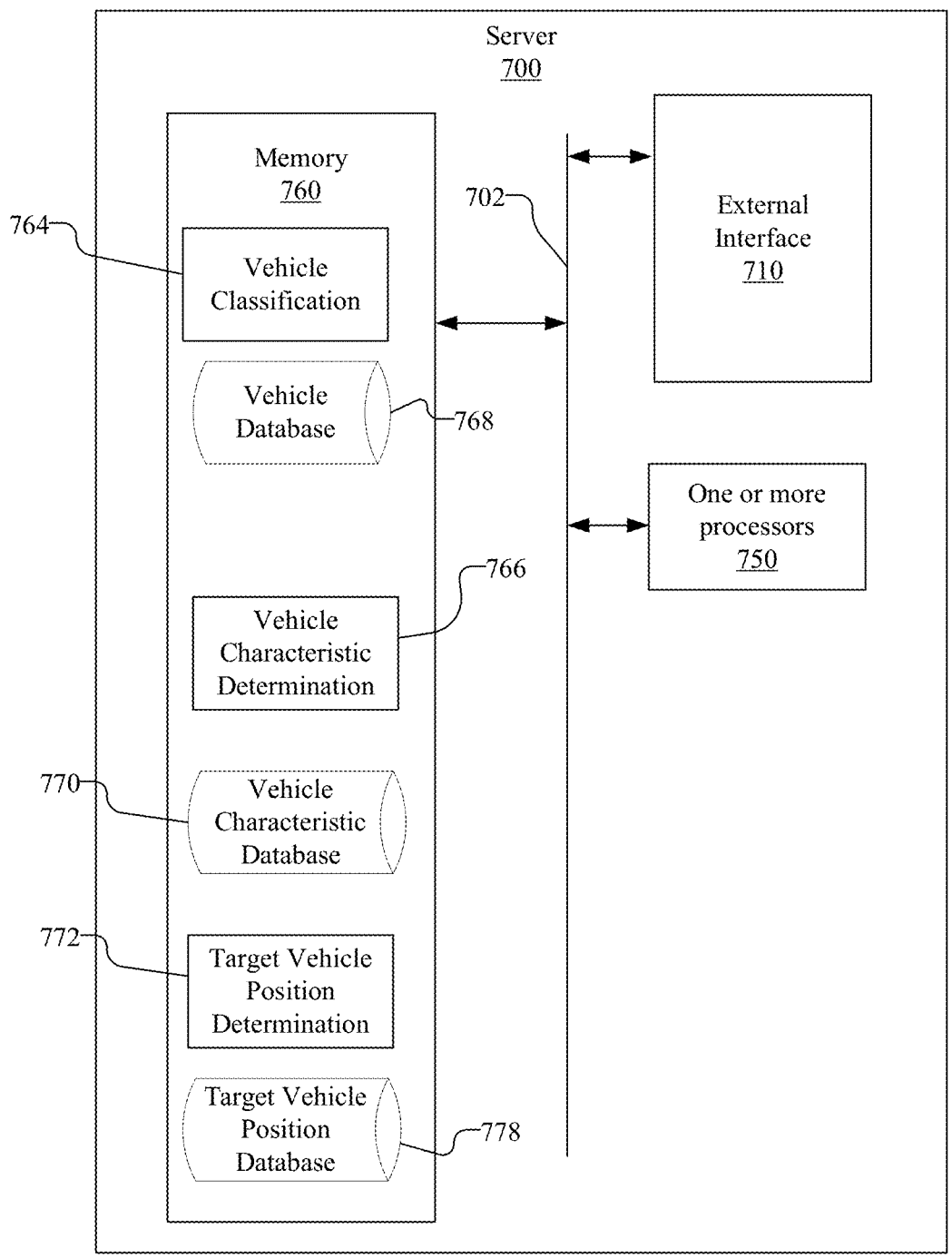
FIG. 7 is a diagram illustrating an example of a hardware implementation of a server to support autonomous driving.

FIG. 7 is a diagram illustrating an example of a hardware implementation of a server 700 capable of V2X communications with V2X entities and supporting autonomous or partially autonomous driving as discussed herein. In some embodiments, server 700 may perform functions associated with AS 110, and/or AS 130 and/or facilitate utilization of cloud services. Server 700 may include, e.g., hardware components such as an external interface (also referred to as communication interface) 710, which may be a wired or wireless communication interface capable of connecting to and communicating with ego vehicle 102 and/or other vehicles including target vehicles 104 directly or through one or more intermediary networks and/or one or more network entities.

Server 700 may include one or more processors 750 and memory 760, which may be coupled together with bus 702. The memory 760 may contain executable code or software instructions that when executed by the one or more processors 750 cause the one or more processors to operate as a special purpose computer programmed to perform the techniques disclosed herein. Processor(s) 750 may include one or more of CPUs, DSPs, NPUs, VPUs, image processors, microcontrollers, ASICs, and/or dedicated hardware as described herein. As one example, a dedicated inference ASIC or a dedicated inference accelerator ASIC may be used to process AI inference workloads to facilitate vehicle detection, classification, and/or identification. As illustrated in FIG. 7, the memory 760 may include one or more components or modules that may be implanted by the one or more processors 750 to perform the methodologies as described herein. While the components or modules are illustrated as software in memory 760 that is executable by the one or more processors 750, it should be understood that the components or modules may include dedicated hardware.

Server 700 may provide assistance information including ADS assistance information, which may facilitate ADS decision making ADS assistance information may include VRAI. VRAI may include information pertinent to vehicle classification, vehicle characteristic information (e.g. dimensional information, distinguishing features, 3D vehicle models, and/or other attributes related to a vehicle), which may facilitate one or more of: target vehicle detection, target vehicle classification, target vehicle unique identification and/or target vehicle localization.

External interface 710 may be used to receive one or more of: images from one or more ego vehicles 102, and/or ego vehicle camera pose and/or ego vehicle pose information, and/or requests for ADS assistance information (e.g. VRAI). External interface 710 may also be used to provide information (e.g. to ego vehicles 102) that is responsive to the above requests.

Memory 760 may include vehicle classification (VCL) 764 that causes the one or more processors 750 to determine a vehicle classification (e.g. make, model, body style, vehicle type etc.) of a target vehicle 104 based on one or more first images received from one or more ego vehicles 102, and the corresponding pose(s) of image sensor(s) at the time of image capture. For example, VCL 764 may include instructions to configure the one or more processors 750 to implement functionality associated with block 210. Memory 760 may include VCL 764 that may configure the one or more processors 750 to perform vehicle classification, send determined vehicle classifications, and/or ADS assistance (e.g. classification assistance) to one or more ego vehicles. In some embodiments, VCL 764 may include instructions to detect and classify target vehicles in received first images by matching the received images with one or more second images of vehicles, (e.g. stored in vehicle database (VDB) 768) based on the image sensor pose at the time of capture of the first images. In some embodiments, a generic model may be used where vehicle classification is difficult (e.g. for a stroller, bicycle, personal transporter, etc.).

In some embodiments, vehicles may be detected in the first images using various salient features such as edges and symmetry. Vehicles may also be detected based on motion blur. In some embodiments, optical flow techniques may be used. In some embodiments, server 700 may also receive image sensor parameters (e.g. focal length and other lens parameters), corresponding image sensor pose(s), and/or other sensory input (e.g. radar) from ego vehicles 102, which may be used during the detection and classification of target vehicles 104 based on the received first images. In some embodiments, upon determining a target vehicle classification, VCL 764 may configure the one or more processors 750 to send the target vehicle classification information to corresponding ego vehicles 102 (e.g. ego vehicles that requested target vehicle classifications based on the first images).

In some embodiments, memory 760 may include vehicle database (VDB) 768. In some embodiments, VDB 768 may correspond to and/or include vehicle database 330 (FIG. 3B). In some embodiments, each image stored in VDB 768 may be associated with a vehicle classification and a pose. Vehicle images may include image of various vehicles be taken at various poses (e.g. as shown in FIG. 3B). Images in VDB 768 may be organized by vehicle type (e.g. bicycle, stroller, scooter, motorcycle, personal transporters, car, van, pickup, truck etc.) and further by body type (e.g. coupe, hatchback, sedan, etc.), make and/or model to facilitate classification. Images stored in VDB 768 may include images of popular vehicles (e.g. based on vehicle sales or vehicle ownership data in a locale frequented by ego vehicle 102, in an area around a current location of ego vehicle 102, or based on a planned route). Vehicle classification may be performed by determining one or more second images in VDB 768 that match (e.g. using image matching/recognition techniques) a first image (e.g. received from ego vehicle 102) based on received information pertaining to the image sensor pose at the time of capture of the first image. The target vehicle may be classified based on the vehicle classification associated with a matching image (e.g. in VDB 768). In some embodiments, the one or more processors 750 implementing VCL 764 may warp the received first images of target vehicle 104 based on received information pertaining to an image sensor pose at the time of capture of the first images and compare the warped images of target vehicle 104 to second images of vehicles stored in VDB 768 (or, stored images in VDB 768 may be warped based on the received information pertaining to the image sensor pose at the time of capture of the first images and compared to received first images). A vehicle classification may be determined based on the degree to which the warped images of target vehicle 104 (or features in the warped image of a target vehicle 104) match images (or corresponding features) of a vehicle (make and model) stored in VDB 768 (or vice versa).

In some embodiments, memory 760 may include Vehicle Characteristic Determination (VCD) 766 that causes the one or more processors 750 to determine vehicle characteristics based on the vehicle classification (e.g. determined by the one or more processors 750 implementing VCL 764). In some embodiments, VCD 766 may include code to implement functionality associated with block 270. The vehicle characteristics may be stored in vehicle characteristic database (VCH-DB) 770 and indexed by vehicle classification. As outlined above, vehicle characteristics may include, for example, one or more of: (a) dimensional information related the vehicle classification (e.g. vehicle height, tail light distance, etc.); and/or (b) a form factor associated with the vehicle classification; and/or (c) various vehicle attributes, and/or (c) a 3D model associated with the vehicle classification (e.g. as shown in FIG. 3D). The dimensional information may be a number, a range, dimensional ratios, and may include associated statistical information such as standard deviation, variance, etc. In some embodiments, vehicle characteristic information may be stored for popular vehicles, which may be: based on vehicle sales or vehicle ownership data in an area, based on a current location of ego vehicle 102, or based on likelihood of interaction along a planned route. In some embodiments, vehicle characteristic information that may be obtained from target vehicles 104. VCH-DB 770 may include 3D geometric models, and/or 3D surface-edge-vertex models, and/or 3D mesh models, and/or 3D relational models, and/or 3D wireframe models, etc.

In some embodiments, server 700 may receive transmissions from various vehicles (e.g. ego vehicle 102 and/or target vehicles 104). For example, a target vehicle 104 may send (either solicited or unsolicited) images of itself, information pertaining to its vehicle classification, and/or vehicle characteristics, which may be received by server 700. In some embodiments, a target vehicle 104 may also send (either solicited or unsolicited) one or more of: (a) a current location of target vehicle 104 (b) other information (e.g. position, speed, acceleration, braking status, license plate information, number of passengers, vehicle usage information, destination, etc.). In some embodiments, VCL 764 may cause the one or more processors 750 to add or augment information in VDB 768 or VCH-DB 770 with the received images, parameters, and/or vehicle characteristics.

In some embodiments, memory 760 may include target position determination unit (TPD) 772 that causes the one or more processors 750 to determine position information related to at least one target vehicle 104 based on vehicle characteristic information. In some embodiments, TPD 772 may include program code to implement functionality associated with block 280. For example, target vehicle characteristics (e.g. vehicle related dimensions, other attributes, etc. from block 210 and/or from running VCD 766) and image sensor pose may be used to determine position information related to target vehicle 104. For example, the one or more processors 750 implementing TPD 772 may use triangulation based on dimensional parameters in target vehicle characteristics (e.g. vehicle width, distance between taillights, etc.) that are visible in the received first images (e.g. from ego vehicles 102), to determine position information for the corresponding target vehicle 104. The position information may include one or more of: range relative to a corresponding ego vehicle 102 (e.g. which requested the target vehicle position determination), target vehicle pose (e.g. position and orientation) of the relative to a corresponding ego vehicle 102. The determined positions of target vehicles 104 may be sent to corresponding ego vehicles 102 (which requested the position determination). In some embodiments, server 700 may maintain the positions of one or more target vehicles relative to an ego vehicle 102 and send the position information of the target vehicles to the ego vehicle 102.

In some embodiments, TPD 772 may also cause the one or more processors 750 to store for each ego vehicle, a current location of one or more target vehicles 104 in Target Vehicle Position database (TVP-DB) 778. TVP-DB 778 may hold, for each ego vehicle, current position information about one or more target vehicles such as a corresponding unique identifier for the target vehicle 104, corresponding relative or absolute pose of the target vehicle 104, a corresponding velocity (speed and direction), corresponding target vehicle behavioral attributes (accelerating/braking, etc.), a corresponding timestamp indicative of the time the target vehicle was last observed, etc.

As illustrated in FIG. 7, the memory 760 may include program code, components, or modules that may be implemented by the one or more processors 750 to perform the methodologies described herein. While the code, components, or modules are illustrated, in FIG. 7, as software in memory 760 that is executable by the one or more processors 750, it should be understood that the code, components, or modules may be dedicated hardware either as part of the one or more processors 750 or implemented as physically separate hardware. In general, VCL 764, VCD 766, may be implemented using some combination of hardware, software, and/or firmware. For example, VCD 766 may be implemented using an image signal processor (ISP) and/or another dedicated hardware component.

The methodologies described herein may be implemented by various means depending upon the application. For example, these methodologies may be implemented in hardware, firmware, software, or any combination thereof. For a hardware implementation, the one or more processors 750 may be implemented within one or more ASICs (including dedicated inference ASICs and/or dedicated inference ASIC accelerators), DSPs, CPUs, NPUs, GPUs, VPUs, image processors, digital signal processing devices (DSPDs), programmable logic devices (PLDs), field programmable gate arrays (FPGAs), processors, controllers, micro-controllers, microprocessors, electronic devices, other electronic units designed to perform the functions described herein, or any combination thereof. In some embodiment, the one or more processors 750 may include capability to detect and classify target vehicles in images (e.g. determine vehicle type), determine target vehicle characteristics (e.g. dimensions related to vehicular features such as headlight distance, taillight distance, bumper light distance, vehicle license plate sizes, etc.), and determine position information for one or more target vehicles. The one or more processors 750 may also include functionality to perform Optical Character Recognition (OCR) (e.g. on vehicle license plates), and perform other well-known computer vision and image processing functions such as feature extraction from images, image comparison, image matching etc.

Any machine-readable medium tangibly embodying instructions may be used in implementing the methodologies described herein. For example, program code may be stored in a memory (e.g. memory 760) and executed by the one or more processors 750, causing the one or more processors 750 to operate as a special purpose computer programmed to perform the techniques disclosed herein. Memory may be implemented within the one or more processors 750 or external to the one or more processors 750. As used herein, the term "memory" refers to any type of long term, short term, volatile, nonvolatile, or other memory and is not to be limited to any particular type of memory or number of memories, or type of media upon which memory is stored. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In some embodiments, server 700 may include means for obtaining one or more images of one or more target vehicles. The means for obtaining one or more images may include external interface 710, memory 760, and/or the one or more processors 750.

Server 700 may include means for classifying target vehicles based on captured images, where the means for classifying may include the one or more processors 750 with dedicated hardware or implementing executable code or software instructions in memory 760 such as VCL 764 and/or VDB 768. In some instances, means for classifying target vehicles based on captured images may further include means for responding to assistance information or vehicle classification requests, which may include external interface 710, and/or the one or more processors 750 with dedicated hardware or implementing executable code or software instructions in memory 760 such as VCL 764 and/or VDB 768. In some instances, means for classifying target vehicles based on captured images may further include means for determining a vehicle make and/or a vehicle model corresponding to one or more target vehicles, where the means for determining a vehicle make and/or a vehicle model may include the one or more processors 750 with dedicated hardware or implementing executable code or software instructions in memory 760 such as VCL 764 and/or VDB 768. In some embodiments, means for classifying target vehicles based on captured images may further include means for determining, for the one or more target vehicles, corresponding matching images of vehicles, each associated with a corresponding vehicle classification. Means for determining, for the one or more target vehicles, corresponding matching images of vehicles may comprise the one or more processors 750 with dedicated hardware or implementing executable code or software instructions in memory 760 such as VCL 764 and/or VDB 768.

Server 700 may include means for obtaining one or more vehicle characteristics corresponding to one or more target vehicles based on the classification of the corresponding target vehicles, where the means for obtaining one or more vehicle characteristics may include the one or more processors 750 with dedicated hardware or implementing executable code or software instructions in memory 760 such as VCD 766 and/or VCH-DB 770. In some embodiments, means for obtaining one or more vehicle characteristics may include means for sending vehicle characteristic information, which may include external interface 710 and/or the one or more processors 750 with dedicated hardware or implementing executable code or software instructions in memory 760 such as VCD 766 and/or VCH-DB 770.

Server 700 may include means for determining the one or more position information of the at least one target vehicle relative to the subject vehicle based on the one or more vehicle characteristics, where the means for obtaining one or more vehicle characteristics may include the one or more processors 750 with dedicated hardware or implementing executable code or software instructions in memory 760 such as TPD 772 and/or TVP-DB 778. In some embodiments, means for determining the one or more position information of the at least one target vehicle relative to the subject vehicle based on the one or more vehicle characteristics, may include means for sending the position information, which may include external interface 710 and/or the one or more processors 750 with dedicated hardware or implementing executable code or software instructions in memory 760 such as TPD 772 and/or TVP-DB 778.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Although the disclosure is illustrated in connection with specific embodiments for instructional purposes, the disclosure is not limited thereto. Various adaptations and modifications may be made without departing from the scope Therefore, the spirit and scope of the appended claims should not be limited to the foregoing description.

What is claimed is:

1. An ego vehicle capable of determining one or more position information of at least one target vehicle relative to the ego vehicle, the ego vehicle comprising:
   at least one image sensor,
   a memory, and
   at least one processor communicatively coupled to the memory and the at least one image sensor and configured to:
   obtain, using the at least one image sensor, one or more first images of one or more target vehicles;
   classify the at least one target vehicle from the one or more target vehicles based on vehicle features identified in the one or more first images;
   determine one or more target vehicle attributes associated with the at least one target vehicle based on the one or more first images and classification of the at least one target vehicle, the one or more target vehicle attributes comprising at least one of a temporary attribute, a semi-permanent attribute, and symmetric attributes;
   obtain one or more vehicle characteristics corresponding to the least one target vehicle based on the classification of the least one target vehicle;
   determine the one or more position information of the at least one target vehicle relative to the ego vehicle based on the one or more vehicle characteristics; and
   track the at least one target vehicle in captured images based at least partially on the one or more target vehicle attributes associated with the at least one target vehicle.

2. The ego vehicle of claim 1, wherein the one or more position information of the at least one target vehicle relative to the ego vehicle comprises at least one of:
   a corresponding range of the at least one target vehicle from the ego vehicle, or
   a corresponding orientation of the at least one target vehicle relative to the ego vehicle, or
   a corresponding position of the at least one target vehicle relative to the ego vehicle.

3. The ego vehicle of claim 1, wherein to classify the at least one target vehicle, the at least one processor is configured to:
   determine at least one of a vehicle make or a vehicle model corresponding to the at least one target vehicle.

4. The ego vehicle of claim 3, wherein to obtain the one or more vehicle characteristics corresponding to the least one target vehicle, the at least one processor is configured to:

obtain, based on the corresponding vehicle make and the corresponding vehicle model of the at least one target vehicle, at least one of:
  one or more corresponding dimensional parameters of the at least one target vehicle; or
  one or more corresponding 3-Dimensional (3D) models of the at least one target vehicle; or
  one or more corresponding form factors of the at least one target vehicle; or
  any combination thereof.

5. The ego vehicle of claim 1, wherein to classify the at least one target vehicle, the at least one processor is configured to:
  determine, for the at least one target vehicle, one or more corresponding matching second images of vehicles, wherein each of the one or more second images of vehicles is associated with a corresponding vehicle classification; and
  classify the at least one target vehicle based on the one or more corresponding matching second images.

6. The ego vehicle of claim 5, wherein the one or more corresponding second images of vehicles are obtained from one or more of:
  a vehicle database coupled to the ego vehicle, or the at least one target vehicle; or
  a server coupled to a Vehicle to Everything (V2X) network associated with the ego vehicle; or
  a cloud-based service coupled to the V2X network associated with the ego vehicle; or
  any combination thereof.

7. The ego vehicle of claim 1, wherein the at least one processor is further configured to:
  display one or more corresponding representations of the at least one target vehicle, based, at least in part, on the one or more position information of the at least one target vehicle, wherein the one or more corresponding representations of the at least one target vehicle are obtained based on the one or more vehicle characteristics corresponding to the at least one target vehicle.

8. The ego vehicle of claim 7, wherein to display the one or more corresponding representations of the at least one target vehicle, the at least one processor is configured to:
  display at least one of: one or more corresponding 3-Dimensional (3D) models of the at least one target vehicle; or one or more corresponding form factors of the at least one target vehicle; or any combination thereof.

9. The ego vehicle of claim 1, wherein the at least one target vehicle is classified based on at least one corresponding partially occluded image of the at least one target vehicle comprised in the one or more first images.

10. The ego vehicle of claim 9, wherein the at least one processor is further configured to:
  display at least one of: one or more corresponding 3-Dimensional (3D) models of the at least one target vehicle; or one or more corresponding form factors of the at least one target vehicle, based, at least in part, on the one or more position information of the at least one target vehicle, wherein the one or more corresponding 3D models and the one or more corresponding form factors are obtained based on the one or more vehicle characteristics.

11. The ego vehicle of claim 1, wherein the one or more position information of the at least one target vehicle is determined based on a comparison of the one or more vehicle characteristics corresponding to the at least one target vehicle with corresponding features of the at least one target vehicle in the one or more first images.

12. The ego vehicle of claim 1, wherein the semi-permanent attribute comprises a semi-permanent attribute over a single driving session; wherein the one or more target vehicle attributes further comprises a semi-permanent attribute over multiple driving sessions, and a permanent attribute.

13. The ego vehicle of claim 1, wherein the one or more target vehicle attributes comprise one or more of physical attributes, behavioral attributes, positional attributes, and visual communication attributes.

14. The ego vehicle of claim 1, wherein the ego vehicle further comprises one or more of at least one radar sensor, at least one lidar sensor, at least one sound sensor, and at least one transceiver, wherein the at least one processor communicatively coupled to the one or more of at least one radar sensor, at least one lidar sensor, at least one sound sensor, and the at least one transceiver, wherein the at least one processor is further configured to:
  obtain data related to the one or more target vehicles using the one or more of at least one radar sensor, at least one lidar sensor, at least one sound sensor, and at least one transceiver;
  wherein the at least one processor is further configured to classify the at least one target vehicle further based on the data related to the one or more target vehicles.

15. The ego vehicle of claim 14, wherein the one or more target vehicle attributes further comprise one or more of auditory attributes, and radio frequency characteristics.

16. The ego vehicle of claim 14, wherein the data related to the one or more target vehicles obtained with the at least one transceiver comprises one or more of a vehicle classification, vehicle characteristics, vehicle identification information, and vehicle behavioral attributes.

17. The ego vehicle of claim 1, wherein the at least one processor is further configured to:
  track the at least one target vehicle based on at least one corresponding partially occluded image of the at least one target vehicle by associating at least one corresponding target vehicle representation with the at least one target vehicle, wherein the at least one corresponding target vehicle representation is obtained based on the one or more vehicle characteristics corresponding to the least one target vehicle obtained based on the classification of the at least one target vehicle.

18. The ego vehicle of claim 17, wherein the at least one corresponding target vehicle representation comprises at least one of a form factor and a three-dimensional model of the at least one target vehicle.

19. The ego vehicle of claim 17, wherein the at least one processor is configured to track the at least one target vehicle by being configured to:
  determine a pose of the at least one target vehicle based on a visible portion of the at least one target vehicle in the at least one corresponding partially occluded image; and
  associate the at least one corresponding target vehicle representation with the visible portion of the at least one target vehicle based on the pose of the at least one target vehicle.

20. A method for determining one or more position information of at least one target vehicle relative to an ego vehicle, the method comprising:
  obtaining one or more first images of one or more target vehicles;

classifying the at least one target vehicle of the one or more target vehicles based on vehicle features identified in the one or more first images;

determining one or more target vehicle attributes associated with the at least one target vehicle based on the one or more first images and classification of the at least one target vehicle, the one or more target vehicle attributes comprising at least one of a temporary attribute, a semi-permanent attribute, and symmetric attributes;

obtaining one or more vehicle characteristics corresponding to the least one target vehicle based on the classification of the least one target vehicle;

determining the one or more position information of the at least one target vehicle relative to the ego vehicle based on the one or more vehicle characteristics; and tracking the at least one target vehicle in captured images based at least partially on the one or more target vehicle attributes associated with the at least one target vehicle.

21. The method of claim 20, wherein the one or more position information of the at least one target vehicle relative to the ego vehicle comprises at least one of:
a corresponding range of the at least one target vehicle from the ego vehicle, or
a corresponding orientation of the at least one target vehicle relative to the ego vehicle, or
a corresponding position of the at least one target vehicle relative to the ego vehicle.

22. The method of claim 20, wherein classifying the at least one target vehicle comprises:
determining at least one of a vehicle make or a vehicle model corresponding to the at least one target vehicle.

23. The method of claim 22, wherein obtaining the one or more vehicle characteristics corresponding to the least one target vehicle comprises:
obtaining, based on the corresponding vehicle make and the corresponding vehicle model of the at least one target vehicle, at least one of:
one or more corresponding dimensional parameters of the at least one target vehicle; or
one or more corresponding 3-Dimensional (3D) models of the at least one target vehicle; or
one or more corresponding form factors of the at least one target vehicle; or
any combination thereof.

24. The method of claim 20, wherein classifying the at least one target vehicle comprises:
determining, for the at least one target vehicle, one or more corresponding matching second images of vehicles, wherein each of the one or more second images of vehicles is associated with a corresponding vehicle classification; and
classifying the at least one target vehicle based on the one or more corresponding matching second images.

25. The method of claim 24, wherein the one or more corresponding second images of vehicles are obtained from one or more of:
a vehicle database coupled to the ego vehicle, or
the at least one target vehicle; or
a server coupled to a Vehicle to Everything (V2X) network associated with the ego vehicle; or
a cloud-based service coupled to the V2X network associated with the ego vehicle; or
any combination thereof.

26. The method of claim 20, further comprising:
displaying one or more corresponding representations of the at least one target vehicle, based, at least in part, on the one or more position information of the at least one target vehicle, wherein the one or more corresponding representations of the at least one target vehicle are obtained based on the one or more vehicle characteristics corresponding to the at least one target vehicle.

27. The method of claim 26, wherein displaying the one or more corresponding representations of the at least one target vehicle comprises:
displaying at least one of: one or more corresponding 3-Dimensional (3D) models of the at least one target vehicle; or one or more corresponding form factors of the at least one target vehicle; or any combination thereof.

28. The method of claim 20, wherein the at least one target vehicle is classified based on at least one corresponding partially occluded image of the at least one target vehicle comprised in the one or more first images.

29. The method of claim 20, further comprising:
tracking the at least one target vehicle based on at least one corresponding partially occluded image of the at least one target vehicle by associating at least one corresponding target vehicle representation with the at least one target vehicle, wherein the at least one corresponding target vehicle representation is obtained based on the one or more vehicle characteristics corresponding to the least one target vehicle obtained based on the classification of the at least one target vehicle.

30. The method of claim 29, further comprising:
displaying the at least one corresponding representation of the at least one target vehicle based on the one or more position information of the at least one target vehicle, wherein the at least one corresponding representation of the at least one target vehicle comprises:
at least one corresponding 3-Dimensional (3D) model; or
at least one corresponding form factor.

31. The method of claim 29, wherein the at least one corresponding target vehicle representation comprises at least one of a form factor and a three-dimensional model of the at least one target vehicle.

32. The method of claim 29, wherein tracking the at least one target vehicle comprises:
determining a pose of the at least one target vehicle based on a visible portion of the at least one target vehicle in the at least one corresponding partially occluded image; and
associating the at least one corresponding target vehicle representation with the visible portion of the at least one target vehicle based on the pose of the at least one target vehicle.

33. The method of claim 20, wherein the method is performed by at least one of:
the ego vehicle, wherein the one or more first images of the one or more target vehicles are obtained by at least one image sensor on the ego vehicle; or
a server coupled to a Vehicle to Everything (V2X) network associated with the ego vehicle, wherein the server receives the one or more first images of the one or more target vehicles over the V2X network; or
any combination thereof.

34. The method of claim 20, wherein the semi-permanent attribute comprises a semi-permanent attribute over a single driving session; wherein the one or more target vehicle attributes further comprises a semi-permanent attribute over multiple driving sessions, and a permanent attribute.

35. The method of claim 20, wherein the one or more target vehicle attributes comprise one or more of physical attributes, behavioral attributes, positional attributes, and visual communication attributes.

36. The method of claim 20, further comprising obtain data related to the one or more target vehicles using one or more of at least one radar sensor, at least one lidar sensor, at least one sound sensor, and at least one transceiver, wherein classifying the at least one target vehicle is further based on the data related to the one or more target vehicles.

37. The method of claim 36, wherein the one or more target vehicle attributes further comprise one or more of auditory attributes, and radio frequency characteristics.

38. The method of claim 36, wherein the data related to the one or more target vehicles obtained with the at least one transceiver comprises one or more of a vehicle classification, vehicle characteristics, vehicle identification information, and vehicle behavioral attributes.

39. An apparatus for determining one or more position information of at least one target vehicle relative to an ego vehicle comprising:
   means for obtaining one or more first images of one or more target vehicles;
   means for classifying the at least one target vehicle from the one or more target vehicles based on vehicle features identified in the one or more first images;
   means for determining one or more target vehicle attributes associated with the at least one target vehicle based on the one or more first images and classification of the at least one target vehicle, the one or more target vehicle attributes comprising at least one of a temporary attribute, a semi-permanent attribute, and symmetric attributes;
   means for obtaining one or more vehicle characteristics corresponding to the least one target vehicle based on the classification of the least one target vehicle;
   means for determining the one or more position information of the at least one target vehicle relative to the ego vehicle based on the one or more vehicle characteristics; and
   means for tracking the at least one target vehicle in captured images based at least partially on the one or more target vehicle attributes associated with the at least one target vehicle.

40. The apparatus of claim 39, wherein the one or more position information of the at least one target vehicle relative to the ego vehicle comprises at least one of:
   a corresponding range of the at least one target vehicle from the ego vehicle, or
   a corresponding orientation of the at least one target vehicle relative to the ego vehicle, or
   a corresponding position of the at least one target vehicle relative to the ego vehicle.

41. The apparatus of claim 39, wherein the means for classifying the at least one target vehicle comprises:
   means for determining at least one of: a vehicle make, or a vehicle model corresponding to the at least one target vehicle.

42. The apparatus of claim 41, wherein means for obtaining the one or more vehicle characteristics corresponding to the least one target vehicle comprises:
   means for obtaining, based on the corresponding vehicle make and the corresponding vehicle model of the at least one target vehicle, at least one of:
   one or more corresponding dimensional parameters of the at least one target vehicle; or
   one or more corresponding 3-Dimensional (3D) models of the at least one target vehicle; or
   one or more corresponding form factors of the at least one target vehicle; or
   any combination thereof.

43. The apparatus of claim 39, wherein the at least one target vehicle is classified based on a partially occluded image of the at least one target vehicle comprised in the one or more first images and the apparatus further comprises:
   means for displaying at least one of: one or more corresponding 3-Dimensional (3D) models of the at least one target vehicle; or one or more corresponding form factors of the at least one target vehicle, based, at least in part, on the one or more position information of the at least one target vehicle, wherein the one or more corresponding 3D models and the one or more corresponding form factors are obtained based on the one or more vehicle characteristics.

44. A non-transitory computer-readable medium comprising stored instructions to configure a processor on an ego vehicle to determine one or more position information of at least one target vehicle relative to the ego vehicle, the instructions to configure the processor to:
   obtain, using at least one image sensor, one or more first images of one or more target vehicles;
   classify the at least one target vehicle from the one or more target vehicles based on vehicle features identified in the one or more first images;
   determine one or more target vehicle attributes associated with the at least one target vehicle based on the one or more first images and classification of the at least one target vehicle, the one or more target vehicle attributes comprising at least one of a temporary attribute, a semi-permanent attribute, and symmetric attributes;
   obtain one or more vehicle characteristics corresponding to at least one target vehicle based on the classification of the least one target vehicle;
   determine the one or more position information of the at least one target vehicle relative to the ego vehicle based on the one or more vehicle characteristics; and
   track the at least one target vehicle in captured images based at least partially on the one or more target vehicle attributes associated with the at least one target vehicle.

45. The computer-readable medium of claim 44, wherein the one or more position information of the at least one target vehicle relative to the ego vehicle comprises at least one of:
   a corresponding range of the at least one target vehicle from the ego vehicle, or
   a corresponding orientation of the at least one target vehicle relative to the ego vehicle, or a corresponding position of the at least one target vehicle relative to the ego vehicle.

* * * * *